United States Patent
Yamashita et al.

(10) Patent No.: US 11,971,540 B2
(45) Date of Patent: Apr. 30, 2024

(54) OPTICAL SYSTEM, OPTICAL APPARATUS, AND METHOD OF MANUFACTURING OPTICAL SYSTEM

(71) Applicant: Nikon Corporation, Tokyo (JP)

(72) Inventors: Masashi Yamashita, Tokyo (JP); Tomoki Ito, Kawasaki (JP); Hiroshi Yabumoto, Yokohama (JP); Hiroshi Yamamoto, Kawasaki (JP); Satoshi Miwa, Yokohama (JP); Keisuke Tsubonoya, Yokohama (JP); Ayumu Makida, Kawaguchi (JP); Takeru Uehara, Ageo (JP)

(73) Assignee: Nikon Corporation, Tokyo (JP)

( * ) Notice: Subject to any disclaimer, the term of this patent is extended or adjusted under 35 U.S.C. 154(b) by 843 days.

(21) Appl. No.: 16/771,649

(22) PCT Filed: Dec. 15, 2017

(86) PCT No.: PCT/JP2017/045187
§ 371 (c)(1),
(2) Date: Oct. 8, 2020

(87) PCT Pub. No.: WO2019/116567
PCT Pub. Date: Jun. 20, 2019

(65) Prior Publication Data
US 2021/0026133 A1   Jan. 28, 2021

(51) Int. Cl.
*G02B 27/00* (2006.01)
*G02B 3/00* (2006.01)
(Continued)

(52) U.S. Cl.
CPC ......... *G02B 27/0025* (2013.01); *G02B 3/00* (2013.01); *G02B 15/1425* (2019.08);
(Continued)

(58) Field of Classification Search
CPC . G02B 5/005; G02B 7/14; G02B 9/64; G02B 13/02; G02B 13/18; G02B 13/26;
(Continued)

(56) References Cited

U.S. PATENT DOCUMENTS

2006/0285227 A1    12/2006   Kobayashi
2006/0285229 A1    12/2006   Ogawa
(Continued)

FOREIGN PATENT DOCUMENTS

JP    2006-301508 A    11/2006
JP    2006-349948 A    12/2006
(Continued)

OTHER PUBLICATIONS

Office Action dated Oct. 25, 2022, in Japanese Patent Application No. 2022-028092.
(Continued)

*Primary Examiner* — Jack Dinh
(74) *Attorney, Agent, or Firm* — Potomac Law Group, PLLC

(57) ABSTRACT

An optical system (LS) includes lenses (L22,L23) satisfying the following conditional expressions, $$ndLZ+(0.01425 \times vdLZ) < 2.12, \text{ and}$$

$$vdLZ < 35.0,$$

where ndLZ: a refractive index of the lens with reference to d-line, and
vdLZ: Abbe number of the lens with reference to d-line.

20 Claims, 22 Drawing Sheets

(51) Int. Cl.
*G02B 15/14* (2006.01)
*G02B 15/163* (2006.01)

(52) U.S. Cl.
CPC ............. *G02B 15/143105* (2019.08); *G02B 15/144113* (2019.08); *G02B 15/144511* (2019.08); *G02B 15/1461* (2019.08); *G02B 15/163* (2013.01); *G02B 2003/0093* (2013.01)

(58) Field of Classification Search
CPC .. G02B 27/0025; G02B 3/00; G02B 15/1425; G02B 15/143105; G02B 15/144113; G02B 15/144511; G02B 15/1461; G02B 2003/0093; G02B 27/4205
See application file for complete search history.

(56) References Cited

U.S. PATENT DOCUMENTS

| | | | |
|---|---|---|---|
| 2015/0241676 A1 | 8/2015 | Komatsu et al. | |
| 2017/0059832 A1 | 3/2017 | Yoshinaga | |

FOREIGN PATENT DOCUMENTS

| | | |
|---|---|---|
| JP | 2007-025653 A | 2/2007 |
| JP | 2009-047986 A | 3/2009 |
| JP | 2009-280724 A | 12/2009 |
| JP | 2010-054667 A | 3/2010 |
| JP | 2011-180392 A | 9/2011 |
| JP | 2012-247451 A | 12/2012 |
| JP | 2015-151280 A | 8/2015 |
| JP | 2015-161693 A | 9/2015 |
| JP | 2016-194609 A | 11/2016 |
| JP | 2017-26713 A † | 2/2017 |
| JP | 2017-049572 A | 3/2017 |
| JP | 2017-190280 A | 10/2017 |
| JP | 2017-219645 A † | 12/2017 |

OTHER PUBLICATIONS

International Preliminary Report on Patentability from International Patent Application No. PCT/JP2017/045187, dated Jun. 25, 2020.
Office Action dated Nov. 30, 2021 for Japanese Patent Application No. 2019-558857.
Office Action dated Apr. 27, 2021 for Japanese Patent Application No. 2019-558857.
Office Action dated Jul. 19, 2021, for Japanese Patent Application No. 201780097685.8.
International Search Report from International Patent Application No. PCT/JP2017/045187, dated Mar. 20, 2018.
Office Action dated Mar. 2, 2022, for Chinese Patent Application No. 201780097685.8.
Office Action dated Mar. 7, 2023, in Japanese Patent Application No. 2022-028092.

† cited by third party

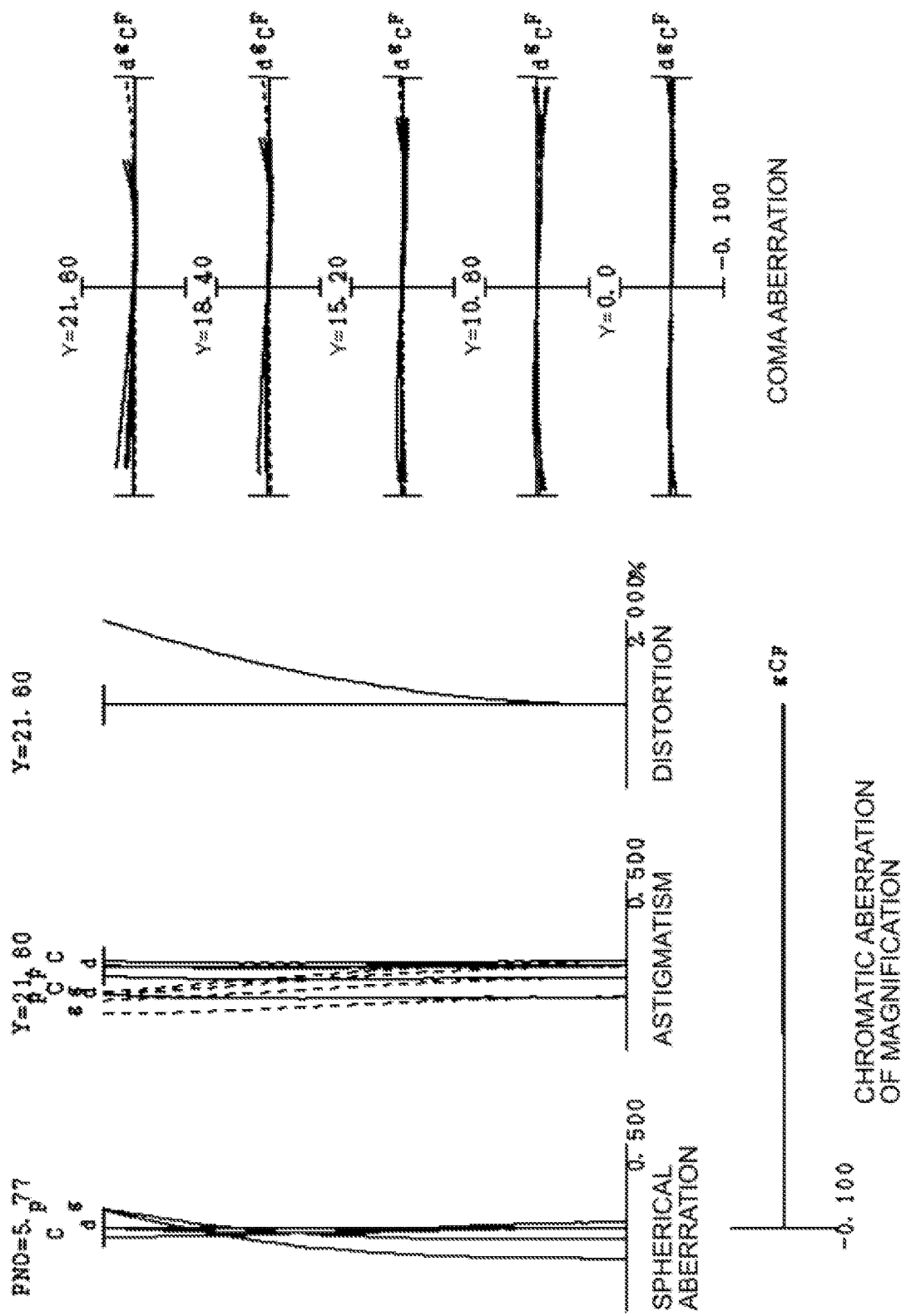

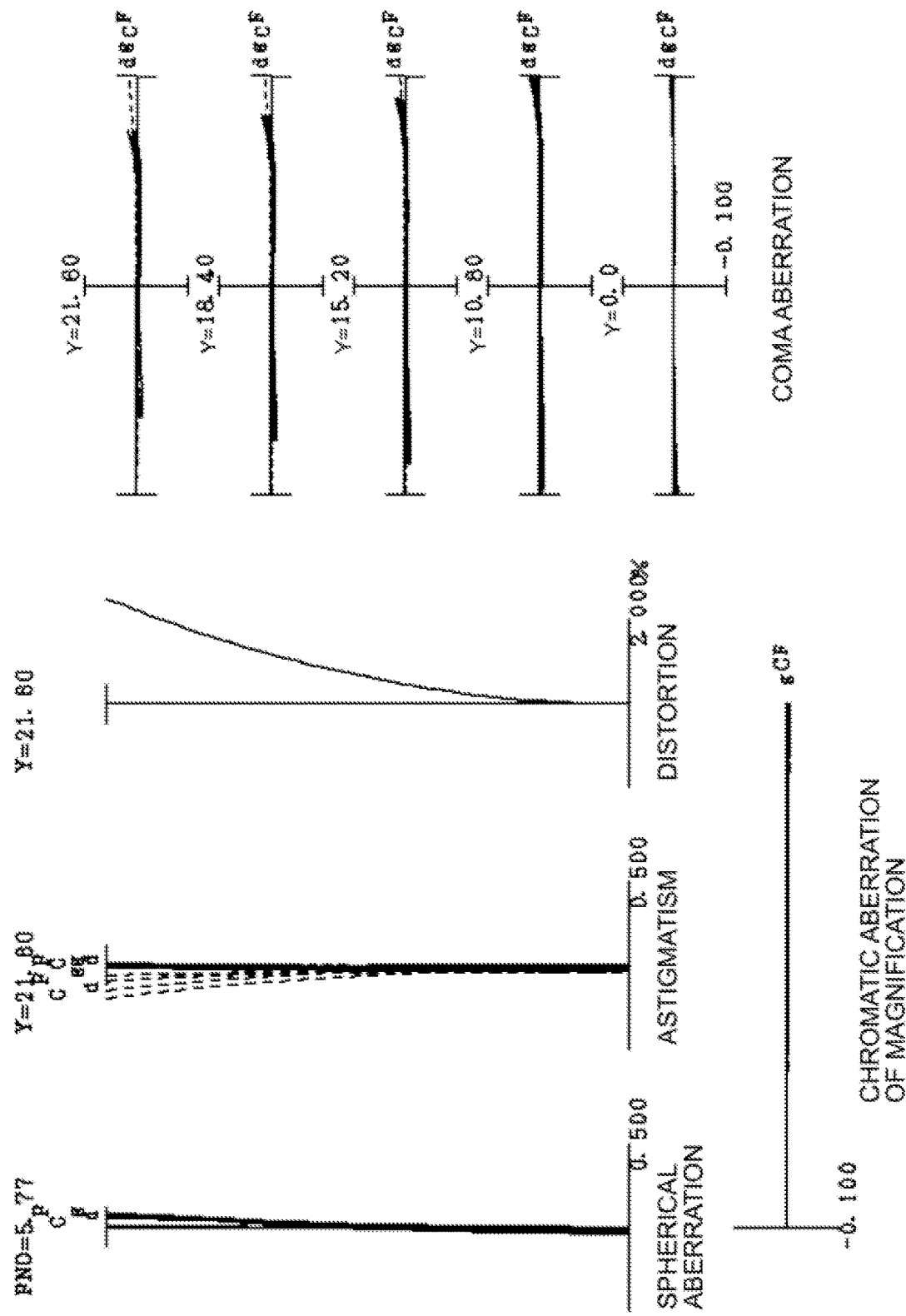

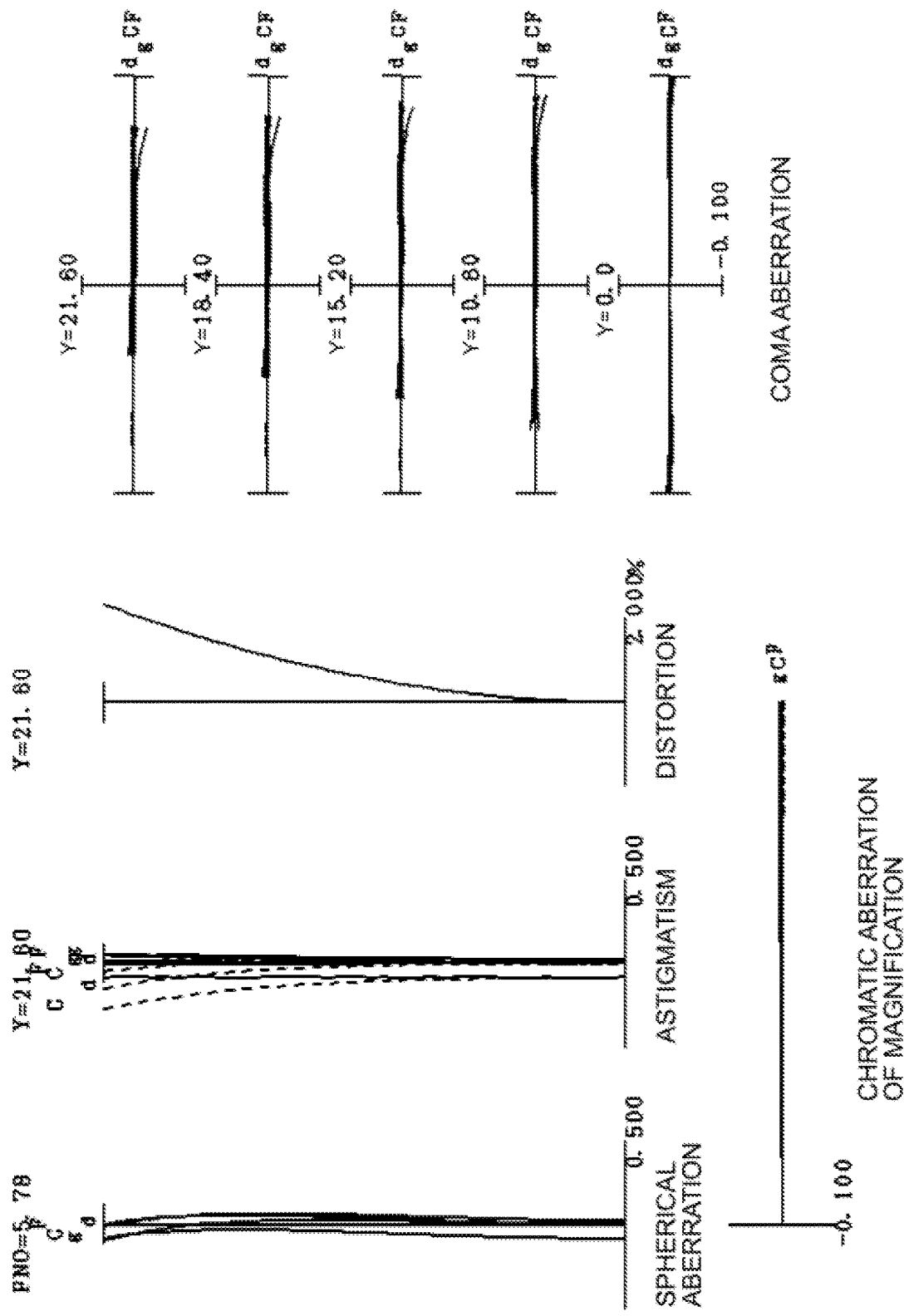

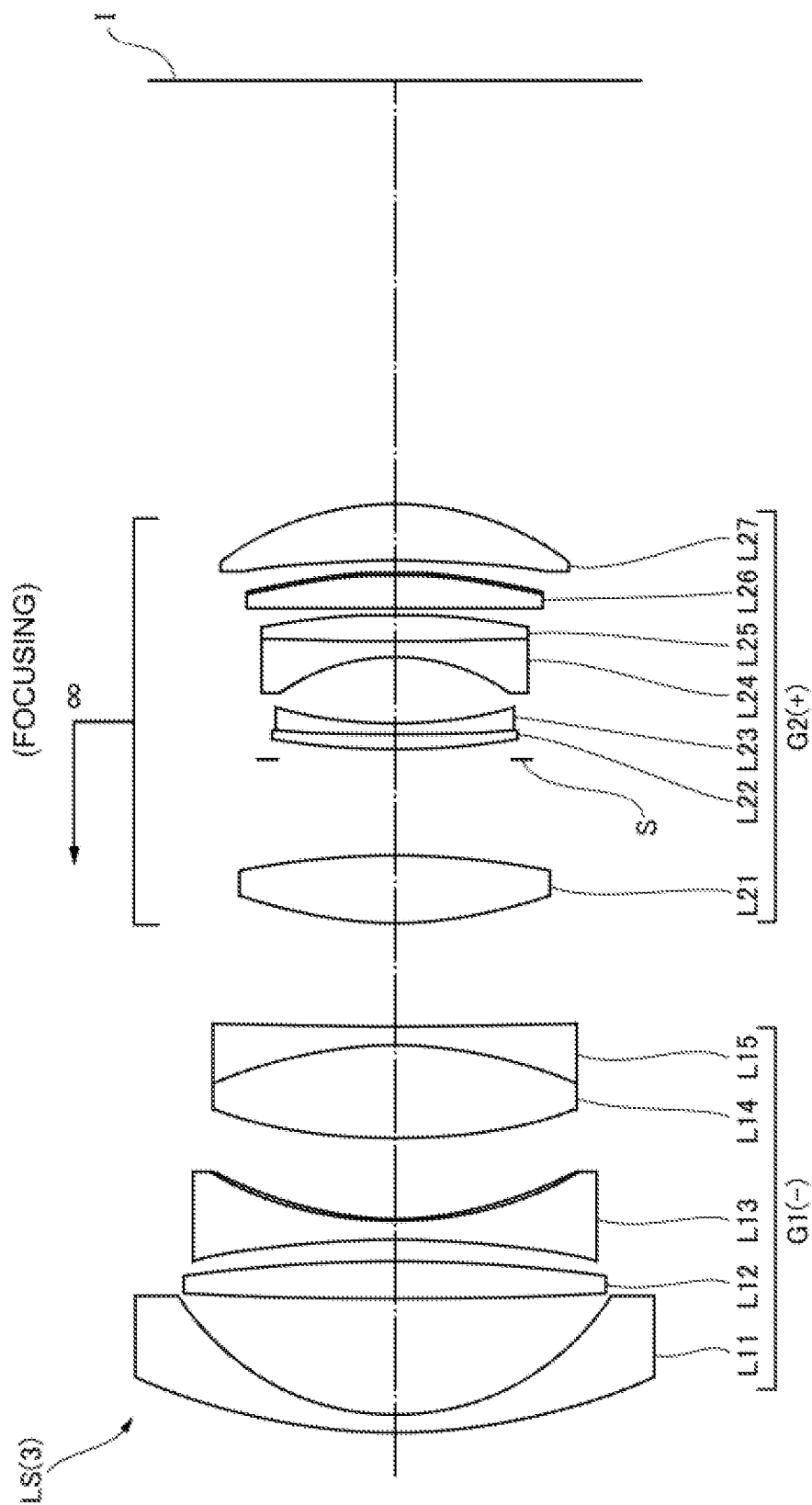

OPTICAL SYSTEM, OPTICAL APPARATUS, AND METHOD OF MANUFACTURING OPTICAL SYSTEM

TECHNICAL FIELD

The present invention relates to an optical system, an optical apparatus, and a method of manufacturing the optical system.

TECHNICAL BACKGROUND

In recent years, the numbers of pixels of imaging elements used for imaging devices, such as digital cameras and video cameras, have been increasing. Photographic lenses provided in imaging devices including such imaging elements are desired to be lenses which have a high resolving power and in which in addition to reference aberrations (aberrations for a single wavelength), such as the spherical aberration and coma aberration, chromatic aberrations are also favorably corrected so as to eliminate color shift in an image with a white light source. In particular, for correcting the chromatic aberration, it is desired that in addition to the primary achromatization, the secondary spectrum be favorably corrected. For example, a method of using a resin material having anomalous dispersion (for example, see Patent Literature 1) has been known as means for correcting the chromatic aberration. As described above, accompanied by improvement in numbers of pixels of imaging elements in recent years, a photographic lens with various aberrations being preferably corrected has been desired.

PRIOR ARTS LIST

Patent Document

Patent Literature 1: Japanese Laid-Open Patent Publication No. 2016-194609(A)

SUMMARY OF THE INVENTION

An optical system according to a first aspect comprises a lens satisfying following conditional expressions, $$ndLZ+(0.01425 \times vdLZ)<2.12, \text{ and}$$

$$vdLZ<35.0,$$

where ndLZ: a refractive index of the lens with reference to d-line, and vdLZ: Abbe number of the lens with reference to d-line.

An optical apparatus according to a second aspect is configured to comprise the optical system described above.

A method of manufacturing an optical system according to a third aspect disposes lenses within a lens barrel so as to comprise a lens satisfying following conditional expressions, $$ndLZ+(0.01425 \times vdLZ)<2.12, \text{ and}$$

$$vdLZ<35.0,$$

where ndLZ: a refractive index of the lens with reference to d-line, and vdLZ: Abbe number of the lens with reference to d-line.

BRIEF DESCRIPTION OF THE DRAWINGS

FIGS. 4A, 4B and 4C show various aberration graphs of the optical system according to the second example upon focusing on infinity in a wide angle end state, an intermediate focal length state, and a telephoto end state, respectively;

FIG. 5 shows a lens configuration of an optical system according to a third example upon focusing on infinity;

DESCRIPTION OF THE EMBODIMENTS

Figure 15:
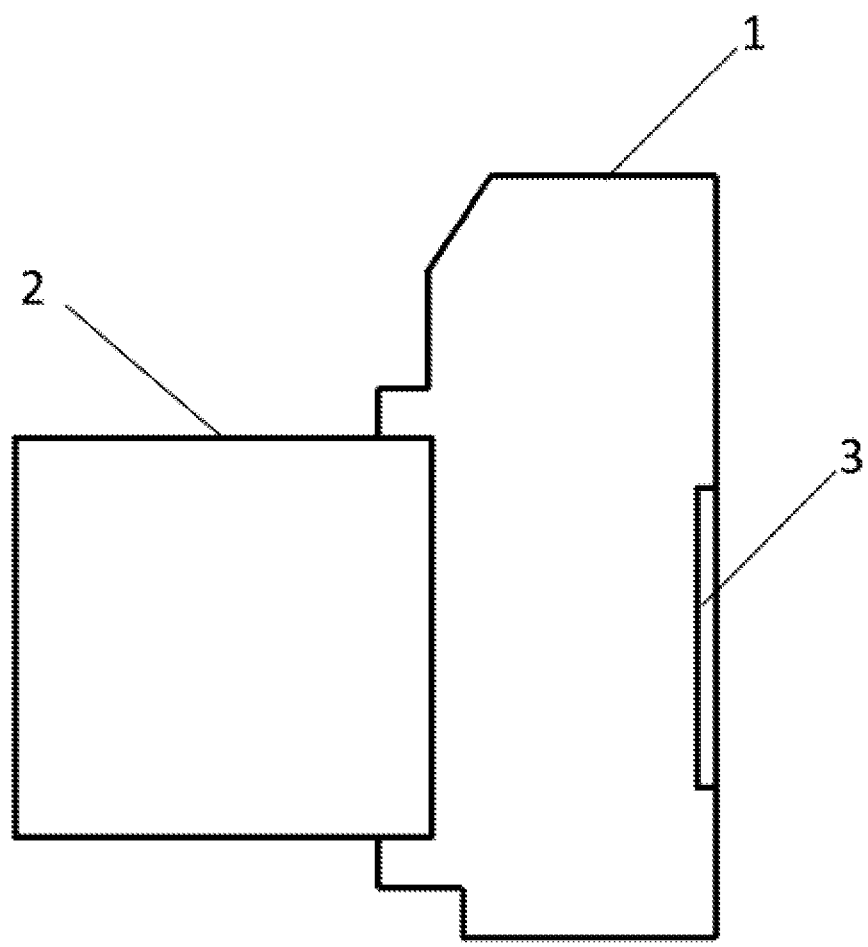
FIG. 15 shows a configuration of a camera comprising the optical system according to this embodiment.

Hereinafter, optical systems and optical apparatuses according to this embodiment are described with reference to the drawings. First, a camera (optical apparatus) including an optical system according to this embodiment is described with reference to FIG. 15. This camera 1 is a digital camera comprising an optical system according to this embodiment as a photographic lens 2 as shown in FIG. 15. In the camera 1, light from an object (subject), not shown, is condensed by the photographic lens 2 and reaches an imaging element 3. Accordingly, the light from the subject is imaged by the imaging element 3, and is recorded as a subject image in a memory, not shown. As described above, a photographer can image the subject through the camera 1. Note that the camera may be a mirrorless camera, or a camera of a single-lens reflex type including a quick-return mirror.

Figure 1:
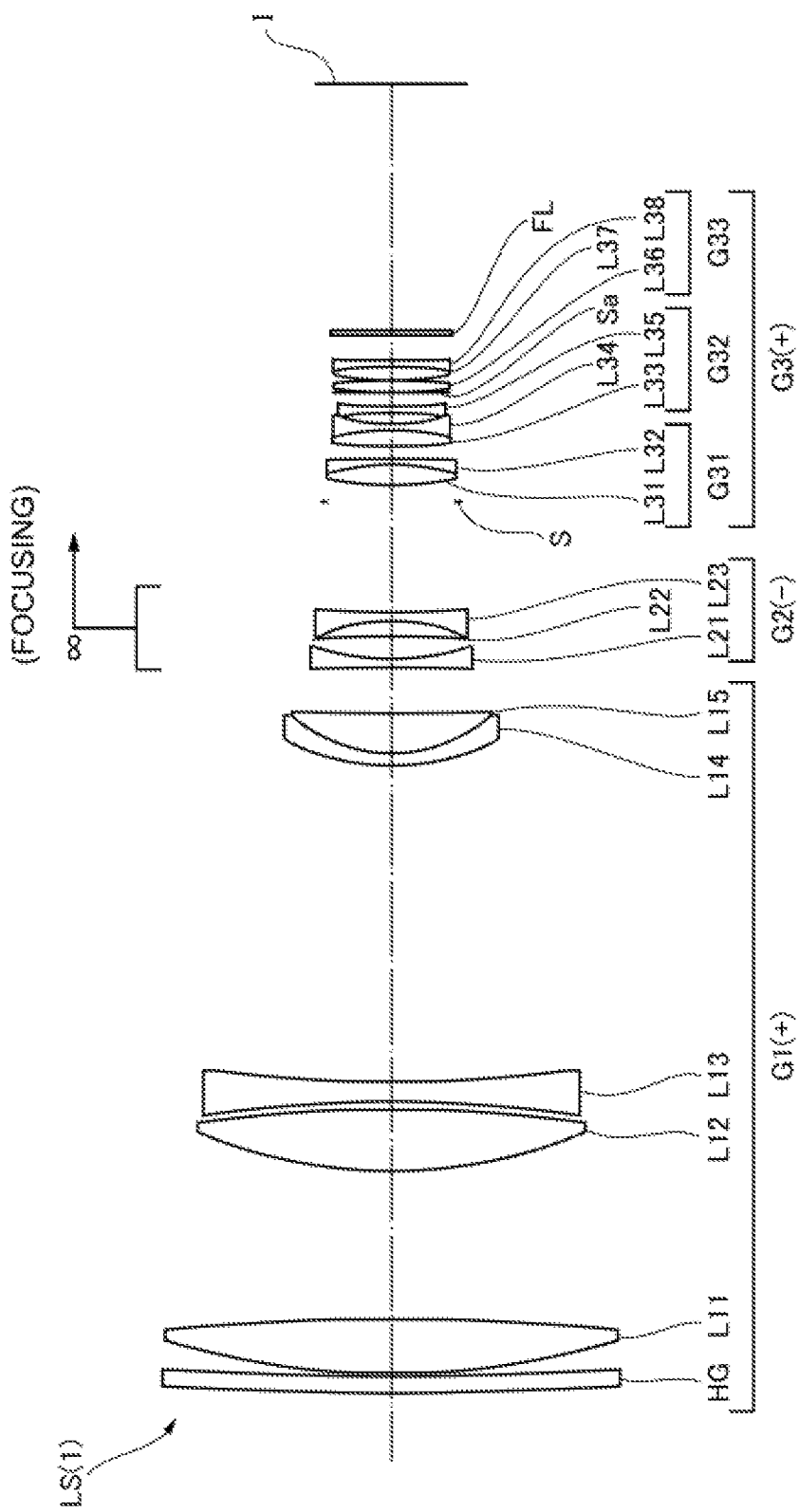
FIG. 1 shows a lens configuration of an optical system according to a first example upon focusing on infinity.

An optical system LS(1) as an example of an optical system (photographic lens) LS according to this embodiment includes lenses (L22 and L33) satisfying the following conditional expressions (1) and (2), as shown in FIG. 1. In this embodiment, to discriminate from the other lenses, the lenses satisfying the conditional expressions (1) and (2) are sometimes called specified lenses.

$$ndLZ+(0.01425\times vdLZ)<2.12 \qquad (1)$$

$$vdLZ<35.0 \qquad (2)$$

where ndLZ: the refractive index of the specified lens with reference to d-line.

vdLZ: Abbe number of the specified lens with reference to d-line.

According to this embodiment, as for correction of the chromatic aberrations, an optical system and an optical apparatus including the optical system can be obtained where in addition to the primary achromatization, the secondary spectrum is favorably corrected. The optical system LS according to this embodiment may be an optical system LS(2) shown in FIG. 3, an optical system LS(3) shown in FIG. 5, or an optical system LS(4) shown in FIG. 7. The optical system LS according to this embodiment may be an optical system LS(5) shown in FIG. 9, an optical system LS(6) shown in FIG. 11, or an optical system LS(7) shown in FIG. 13.

The conditional expression (1) defines an appropriate relationship between the refractive index of the specified lens with reference to d-line and the Abbe number with reference to d-line. By satisfying the conditional expression (1), correction of reference aberrations, such as the spherical aberration and coma aberration, and correction of primary chromatic aberration (achromatization) can be favorably performed.

When the corresponding value of the conditional expression (1) exceeds the upper limit value, the Petzval sum becomes small, for example, and correction of the curvature of field becomes difficult. Accordingly, this is not preferable. Setting the upper limit value of the conditional expression (1) to 2.11 can securely achieve the advantageous effects of this embodiment. To achieve the advantageous effects of this embodiment further securely, it is preferable to set the upper limit value of the conditional expression (1) to 2.10, 2.09, 2.08, 2.07, or furthermore, 2.06.

The conditional expression (2) defines an appropriate range of the Abbe number of the specified lens with reference to d-line. By satisfying the conditional expression (2), correction of reference aberrations, such as the spherical aberration and coma aberration, and correction of primary chromatic aberration (achromatization) can be favorably performed.

When the corresponding value of the conditional expression (2) exceeds the upper limit value, for example, it is difficult to correct the longitudinal chromatic aberration of a partial group nearer to an object or an image than an aperture stop S. Accordingly, this is not preferable. Setting the upper limit value of the conditional expression (2) to 32.5 can securely achieve the advantageous effects of this embodiment. To achieve the advantageous effects of this embodiment further securely, it is preferable to set the upper limit value of the conditional expression (2) to 32.0, 31.5, 31.0, 30.5, 30.0, or furthermore, 29.5.

In the optical system of this embodiment, it is desired that the specified lens satisfy the following conditional expression (3).

$$0.702<\theta gFLZ+(0.00316\times vdLZ) \qquad (3)$$

Where θgFLZ: a partial dispersion ratio of the lens, which is defined by the following expression, $$\theta gFLZ=(ngLZ-nFLZ)/(nFLZ-nCLZ).$$

wherein a refractive index of the lens with reference to g-line is ngLZ, a refractive index of the lens with reference to F-line is nFLZ, and a refractive index of the lens with reference to C-line is nCLZ.

Note that the Abbe number vdLZ of the specified lens with reference to d-line is defined by the following expression, $$vdLZ=(ndLZ-1)/(nFLZ-nCLZ).$$

The conditional expression (3) appropriately specifies the anomalous dispersion of the specified lens. By satisfying the conditional expression (3), as for correction of the chromatic aberrations, in addition to the primary achromatization, the secondary spectrum can be favorably corrected.

When the corresponding value of the conditional expression (3) falls below the lower limit value, the anomalous dispersion of the specified lens becomes small. Accordingly, it becomes difficult to correct the chromatic aberration. Setting the lower limit value of the conditional expression (3) to 0.704 can securely achieve the advantageous effects of this embodiment. To achieve the advantageous effects of this embodiment further securely, it is preferable to set the lower limit value of the conditional expression (3) to 0.708, 0.710, 0.712, or furthermore, 0.715.

In the optical system of this embodiment, the specified lens may satisfy the following conditional expression (2-1).

$$18.0<vdLZ<35.0 \qquad (2-1)$$

The conditional expression (2-1) is an expression similar to the conditional expression (2). By satisfying the conditional expression (2-1), correction of reference aberrations, such as the spherical aberration and coma aberration, and correction of primary chromatic aberration (achromatization) can be favorably performed. Setting the upper limit value of the conditional expression (2-1) to 32.5 can securely achieve the advantageous effects of this embodiment. To achieve the advantageous effects of this embodiment further securely, it is preferable to set the upper limit value of the conditional expression (2-1) to 32.0, 31.5, 31.0, 30.5, 30.0, or furthermore, 29.5. On the other hand, setting the lower limit value of the conditional expression (2-1) to 20.0 can securely achieve the advantageous effects of this embodiment. To achieve the advantageous effects of this embodiment further securely, it is preferable to set the lower limit value of the conditional expression (2-1) to 23.0, 23.5, 24.0, 24.5, 25.0, 25.5, 26.0, 26.5, 27.0, 27.5, or furthermore, 27.7.

In the optical system of this embodiment, it is desired that the specified lens satisfy the following conditional expression (4).

$$1.83<ndLZ+(0.00787\times vdLZ) \qquad (4)$$

The conditional expression (4) defines an appropriate relationship between the refractive index of the specified lens with reference to d-line and the Abbe number with reference to d-line. By satisfying the conditional expression (4), correction of reference aberrations, such as the spherical aberration and coma aberration, and correction of primary chromatic aberration (achromatization) can be favorably performed.

When the corresponding value of the conditional expression (4) falls below the lower limit value, correction of the reference aberrations, in particular, the spherical aberration becomes difficult due to, for example, reduction in the refractive index of the specified lens. Accordingly, this is not preferable. Setting the lower limit value of the conditional expression (4) to 1.84 can securely achieve the advantageous effects of this embodiment. To achieve the advantageous effects of this embodiment further securely, it is preferable to set the lower limit value of the conditional expression (4) to 1.85, or furthermore, 1.86.

In the optical system of this embodiment, it is desired that the specified lens satisfy the following conditional expression (5).

$$1.55 < ndLZ \quad (5)$$

The conditional expression (5) defines an appropriate range of the refractive index of the specified lens with reference to d-line. By satisfying the conditional expression (5), the various aberrations, such as the coma aberration and the chromatic aberrations (the longitudinal chromatic aberration and the chromatic aberration of magnification), can be favorably corrected.

When the corresponding value of the conditional expression (5) falls below the lower limit value, correction of the various aberrations, such as the coma aberration and the chromatic aberrations (the longitudinal chromatic aberration and the chromatic aberration of magnification). Accordingly, this is not preferable. Setting the lower limit value of the conditional expression (5) to 1.58 can securely achieve the advantageous effects of this embodiment. To achieve the advantageous effects of this embodiment further securely, it is preferable to set the lower limit value of the conditional expression (5) to 1.60, 1.62, 1.65, 1.68, 1.70, or furthermore, 1.72.

In the optical system of this embodiment, it is desired that the specified lens satisfy the following conditional expression (6).

$$DLZ > 0.80 \quad (6)$$

where DLZ: a thickness [mm] of the lens on an optical axis.

The conditional expression (6) defines an appropriate range of the thickness of the specified lens on the optical axis. By satisfying the conditional expression (6), the various aberrations, such as the coma aberration and the chromatic aberrations (the longitudinal chromatic aberration and the chromatic aberration of magnification), can be favorably corrected.

When the corresponding value of the conditional expression (6) falls below the lower limit value, correction of the various aberrations, such as the coma aberration, and chromatic aberrations (the longitudinal chromatic aberration and the chromatic aberration of magnification) becomes difficult. Accordingly, this is not preferable. Setting the lower limit value of the conditional expression (6) to 0.90 can securely achieve the advantageous effects of this embodiment. To achieve the advantageous effects of this embodiment further securely, it is preferable to set the lower limit value of the conditional expression (6) to 1.00, 1.10, 1.20, or furthermore, 1.30.

In the optical system of this embodiment, it is desired that the specified lens satisfy the following conditional expressions (5-1) and (7).

$$ndLZ < 1.63 \quad (5\text{-}1)$$

$$ndLZ - (0.040 \times vdLZ - 2.470) \times vdLZ < 39.809 \quad (7)$$

The conditional expression (5-1) is an expression similar to the conditional expression (5). By satisfying the conditional expression (5-1), the various aberrations, such as the coma aberration, and the chromatic aberrations (the longitudinal chromatic aberration and the chromatic aberration of magnification), can be favorably corrected. Setting the upper limit value of the conditional expression (5-1) to 1.62 can securely achieve the advantageous effects of this embodiment.

The conditional expression (7) defines an appropriate relationship between the refractive index of the specified lens with reference to d-line and the Abbe number with reference to d-line. By satisfying the conditional expression (7), correction of reference aberrations, such as the spherical aberration and coma aberration, and correction of primary chromatic aberration (achromatization) can be favorably performed.

When the corresponding value of the conditional expression (7) exceeds the upper limit value, the Petzval sum becomes small, for example, and correction of the curvature of field becomes difficult. Accordingly, this is not preferable. Setting the upper limit value of the conditional expression (7) to 39.800 can securely achieve the advantageous effects of this embodiment. To achieve the advantageous effects of this embodiment further securely, it is preferable to set the upper limit value of the conditional expression (7) to 39.500, 39.000, 38.500, 38.000, 37.500, or furthermore, 36.800.

In the optical system of this embodiment, it is desired that the specified lens satisfy the following conditional expression (8).

$$ndLZ - (0.020 \times vdLZ - 1.080) \times vdLZ < 16.260 \quad (8)$$

The conditional expression (8) defines an appropriate relationship between the refractive index of the specified lens with reference to d-line and the Abbe number with reference to d-line. By satisfying the conditional expression (8), correction of reference aberrations, such as the spherical aberration and coma aberration, and correction of primary chromatic aberration (achromatization) can be favorably performed.

When the corresponding value of the conditional expression (8) exceeds the upper limit value, the Petzval sum becomes small, for example, and correction of the curvature of field becomes difficult. Accordingly, this is not preferable. Setting the upper limit value of the conditional expression (8) to 16.240 can securely achieve the advantageous effects of this embodiment. To achieve the advantageous effects of this embodiment further securely, it is preferable to set the upper limit value of the conditional expression (8) to 16.000, 15.800, 15.500, 15.300, 15.000, 14.800, 14.500, 14.000, or furthermore, 13.500.

In the optical system of this embodiment, the specified lens may satisfy the following conditional expression (2-2).

$$18.0 < vdLZ < 27.0 \quad (2\text{-}2)$$

The conditional expression (2-2) is an expression similar to the conditional expression (2). By satisfying the conditional expression (2-2), correction of reference aberrations, such as the spherical aberration and coma aberration, and correction of primary chromatic aberration (achromatization) can be favorably performed. Setting the upper limit value of the conditional expression (2-2) to 26.6 can securely achieve the advantageous effects of this embodiment. To achieve the advantageous effects of this embodiment further securely, it is preferable to set the upper limit value of the conditional expression (2-2) to 26.3, 26.0, 25.7, or furthermore, 25.4. On the other hand, setting the lower limit value of the conditional expression (2-2) to 21.0 can securely achieve the advantageous effects of this embodiment. To achieve the advantageous effects of this embodiment further securely, it is preferable to set the lower limit value of the conditional expression (2-2) to 21.5, 22.0, 22.5, or furthermore, 23.0.

In the optical system of this embodiment, the specified lens may satisfy the following conditional expression (5-2).

$$1.700 < ndLZ < 1.850 \tag{5-2}$$

The conditional expression (5-2) is an expression similar to the conditional expression (5). By satisfying the conditional expression (5-2), the various aberrations, such as the coma aberration and the chromatic aberrations (longitudinal chromatic aberration and the chromatic aberration of magnification), can be favorably corrected. Setting the upper limit value of the conditional expression (5-2) to 1.830 can securely achieve the advantageous effects of this embodiment. To achieve the advantageous effects of this embodiment further securely, it is preferable to set the upper limit value of the conditional expression (5-2) to 1.810, 1.790, 1.770, or furthermore, 1.764. On the other hand, setting the lower limit value of the conditional expression (5-2) to 1.709 can securely achieve the advantageous affects of this embodiment. To achieve the advantageous effects of this embodiment further securely, it is preferable to set the lower limit value of the conditional expression (5-2) to 1.718, 1.727, 1.736, or furthermore, 1.745.

In the optical system of this embodiment, the specified lens nay satisfy the following conditional expression (3-1).

$$0.702 < \theta gFLZ + (0.00316 \times vdLZ) < 0.900 \tag{3-1}$$

The conditional expression (3-1) is an expression similar to the conditional expression (3). By satisfying the conditional expression (3-1), as for correction of the chromatic aberrations, in addition to the primary achromatization, the secondary spectrum can be favorably corrected. Setting the upper limit value of the conditional expression (3-1) to 0.850 can securely achieve the advantageous effects of this embodiment. To achieve the advantageous effects of this embodiment further securely, it is preferable to set the upper limit value of the conditional expression (3-1) to 0.800, or furthermore, 0.720. On the other hand, setting the lower limit value of the conditional expression (3-1) to 0.704 can securely achieve the advantageous effects of this embodiment. To achieve the advantageous effects of this embodiment further securely, it is preferable to set the lower limit value of the conditional expression (3-1) to 0.706.

In the optical system of this embodiment, the specified lens may satisfy the following conditional expression (5-3).

$$1.550 < ndLZ < 1.700 \tag{5-3}$$

The conditional expression (5-3) is an expression similar to the conditional expression (5). By satisfying the conditional expression (5-3), the various aberrations, such as the coma aberration and the chromatic aberrations (the longitudinal chromatic aberration and the chromatic aberration of magnification) can be favorably corrected. Setting the upper limit value of the conditional expression (5-3) to 1.699 can securely achieve the advantageous effects of this embodiment. To achieve the advantageous effects of this embodiment further securely, it is preferable to set the upper limit value of the conditional expression (5-3) to 1.698, 1.697, 1.696, or furthermore, 1.695. On the other hand, setting the lower limit value of the conditional expression (5-3) to 1.560 can securely achieve the advantageous effects of this embodiment. To achieve the advantageous effects of this embodiment further securely, it is preferable to set the lower limit value of the conditional expression (5-3) to 1.570, 1.580, 1.590, or furthermore, 1.600.

In the optical system of this embodiment, the specified lens may satisfy the following conditional expression (2-3).

$$27.0 < vdLZ < 35.0 \tag{2-3}$$

The conditional expression (2-3) is an expression similar to the conditional expression (2). By satisfying the conditional expression (2-3), correction of reference aberrations, such as the spherical aberration and coma aberration, and correction of primary chromatic aberration (achromatization) can be favorably performed. Setting the upper limit value of the conditional expression (2-3) to 34.5 can securely achieve the advantageous effects of this embodiment. To achieve the advantageous effects of this embodiment further securely, it is preferable to set the upper limit value of the conditional expression (2-3) to 34.0, 33.5, or furthermore, 32.9. On the other hand, setting the lower limit value of the conditional expression (2-3) to 28.0 can securely achieve the advantageous effects of this embodiment. To achieve the advantageous effects of this embodiment further securely, it is preferable to set the lower limit value of the conditional expression (2-3) to 29.0, 30.0, or furthermore, 31.0.

In the optical system of this embodiment, the specified lens may satisfy the following conditional expression (5-4).

$$1.550 < ndLZ < 1.700 \tag{5-4}$$

The conditional expression (5-4) is an expression similar to the conditional expression (5). By satisfying the conditional expression (5-4), the various aberrations, such as the coma aberration and the chromatic aberrations (the longitudinal chromatic aberration and the chromatic aberration of magnification), can be favorably corrected. Setting the upper limit value of the conditional expression (5-4) to 1.675 can securely achieve the advantageous effects of this embodiment. To achieve the advantageous effects of this embodiment further securely, it is preferable to set the upper limit value of the conditional expression (5-4) to 1.660, 1.645, 1.630, or furthermore, 1.615. On the other hand, setting the lower limit value of the conditional expression (5-4) to 1.560 can securely achieve the advantageous effects of this embodiment. To achieve the advantageous effects of this embodiment further securely, it is preferable to set the lower limit value of the conditional expression (5-4) to 1.570, 1.580, 1.590, or furthermore, 1.600.

In the optical system of this embodiment, the specified lens may satisfy the following conditional expression (2-4).

$$25.0 < vdLZ < 31.0 \tag{2-4}$$

The conditional expression (2-4) is an expression similar to the conditional expression (2). By satisfying the conditional expression (2-4), correction of reference aberrations, such as the spherical aberration and coma aberration, and correction of primary chromatic aberration (achromatization) can be favorably performed. Setting the upper limit value of the conditional expression (2-4) to 30.9 can securely achieve the advantageous effects of this embodiment. To achieve the advantageous effects of this embodiment further securely, it is preferable to set the upper limit value of the conditional expression (2-4) to 30.8. On the other hand, setting the lower limit value of the conditional expression (2-4) to 25.6 can securely achieve the advantageous effects of this embodiment. To achieve the advantageous effects of this embodiment further securely, it is preferable to set the lover limit value of the conditional expression (2-4) to 26.0, 26.4, or furthermore, 26.8.

In the optical system of this embodiment, the specified lens may satisfy the following conditional expression (5-5).

$$1.550 < ndLZ < 1.800 \tag{5-5}$$

The conditional expression (5-5) is an expression similar to the conditional expression (5). By satisfying the conditional expression (5-5), the various aberrations, such as the coma aberration and the chromatic aberrations (the longitudinal chromatic aberration and the chromatic aberration of magnification), can be favorably corrected. Setting the upper limit value of the conditional expression (5-5) to 1.770 can securely achieve the advantageous effects of this embodiment. To achieve the advantageous effects of this embodiment further securely, it is preferable to set the upper limit value of the conditional expression (5-5) to 1.745, 1.720, or furthermore, 1.695. On the other hand, setting the lower limit value of the conditional expression (5-5) to 1.565 can securely achieve the advantageous effects of this embodiment. To achieve the advantageous effects of this embodiment further securely, it is preferable to set the lower limit value of the conditional expression (5-5) to 1.590, 1.605, or furthermore, 1.622.

It is desired that the optical system of this embodiment further comprise an object-side lens disposed nearest to an object, wherein the specified lens be disposed nearer to an image than the object-side lens. Accordingly, the various aberrations, such as the coma aberration and the chromatic aberrations (the longitudinal chromatic aberration and the chromatic aberration of magnification), can be favorably corrected.

It is desired that the optical system of this embodiment further comprise an image-side lens disposed nearest to an image, wherein the specified lens be disposed nearer to an object than the image-side lens. Accordingly, the various aberrations, such as the coma aberration and the chromatic aberrations (the longitudinal chromatic aberration and the chromatic aberration of magnification), can be favorably corrected.

In the optical system of this embodiment, it is desired that the specified lens be a glass lens. Accordingly, in comparison with a case where the material is a resin, the lens that is resistant to temporal change and is resistant to environmental change, such as change in temperature, can be obtained.

Figure 16:
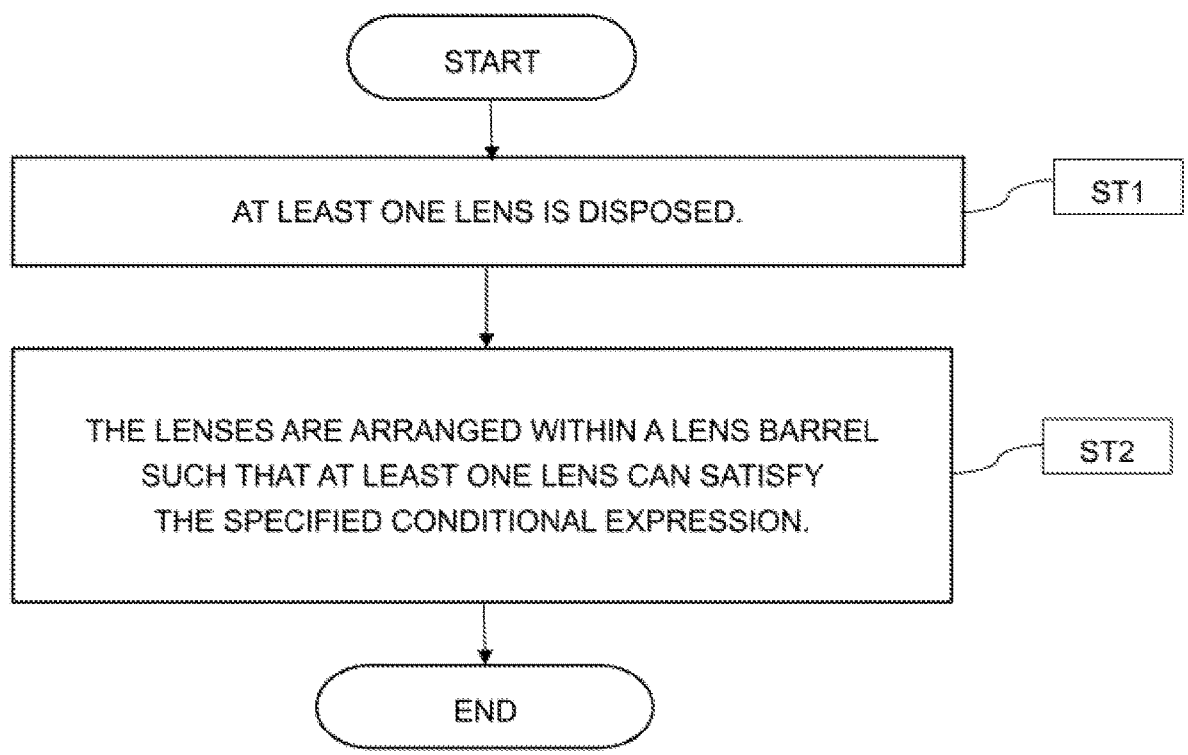
FIG. 16 is a flowchart showing a method of manufacturing the optical system according to this embodiment.

Subsequently, referring to FIG. 16, a method of manufacturing the aforementioned optical system LS is generally described. First, at least one lens is disposed (step ST1). At this time, the lenses are arranged within a lens barrel such that at least one (specified lens) of the lenses can satisfy the conditional expressions (1) to (2) and the like (step ST2). According to such a manufacturing method, as for correction of the chromatic aberrations, an optical system can be manufactured where in addition to the primary achromatization, the secondary spectrum is favorably corrected.

EXAMPLES

Hereinafter, the optical system LS according to examples of this embodiment are described with reference to the drawings. FIGS. 1, 3, 5, 7, 9, 11 and 13 are sectional views showing the configurations and refractive power distributions of optical systems LS {LS(1) to LS(7)} according to first to seventh examples. For the optical system LS(1) according to the first example, the optical system LS(3) according to the third example, and the optical systems LS(6) to LS(7) according to the sixth to seventh examples, the movement direction during focusing of a focusing lens group from infinity to a short-distance object is indicated by an arrow accompanied by characters "FOCUSING". In the sectional views of the optical system LS(2) according to the second example and the optical systems LS(4) to LS(5) according to fourth to fifth examples, the movement direction of each lens group along the optical axis during rooming from the wide angle end state (W) to the telephoto end state (T) is indicated by an arrow.

In these FIGS. 1, 3, 5, 7, 9, 11 and 13, each lens group is represented by a combination of a symbol G and a numeral, and each lens is represented by a combination of a symbol L and a numeral. In this case, to prevent complication due to increase in the number of types of symbols and numerals, combinations of symbols and numerals are used independently among the individual examples to represent the lens groups and the like. Accordingly, even though the same combinations between symbols and numerals are used among the examples, such usage does not mean the same configuration.

Tables 1 to 7 are hereinafter shown. Among the tables, Table 1 is a table indicating data on the first example, Table 2 is that on the second example, Table 3 is that on the third example, Table 4 is that on the fourth example, Table 5 is that on the fifth example, Table 6 is that on the sixth example, and Table 7 is that on the seventh example. In each example, d-line (wavelength $\lambda$=587.6 nm), g-line (wavelength $\lambda$=435.8 nm), C-line (wavelength $\lambda$=656.3 nm) and F-line (wavelength $\lambda$=486.1 nm) are selected as aberration characteristics to be calculated.

In [General Data] table, f indicates the focal length of the entire zoom lens, FNO indicates the F-number, $2\omega$ indicates the angle of view (the unit is ° (degrees), and $\omega$ indicates the half angle of view), and Y indicates the image height. TL indicates the distance obtained by adding BF to the distance from the lens forefront surface to the lens last surface on the optical axis upon focusing on infinity. BF indicates the distance (backfocus) from the lens last surface to an image surface I on the optical axis upon focusing on infinity. Note that in a case where the optical system is a zoom optical system, these values indicate data in each of rooming states at the wide-angle end (W), intermediate focal length (M) and telephoto end (T).

In [Lens Data] table, Surface Number indicates the order of optical surfaces from the object side along the ray traveling direction, R indicates the radius of curvature of each optical surface (a surface whose center of curvature is positioned on the image side is assumed to have a positive value), D indicates the surface distance that is the distance from each optical surface to the next optical surface (or the image surface), nd indicates the refractive index of the material of the optical member with reference to d-line, vd indicates the Abbe number of the material of the optical member with reference to d-line, and $\theta$gF indicates the partial dispersion ratio of the material of the optical member. The "∞" of the radius of curvature indicates a flat surface or an aperture, and (Aperture Stop S) indicates the aperture stop S. The description of the refractive index of air nd=1.00000 is omitted. In a case where the optical surface is an aspherical surface, the surface number is assigned *a symbol. In a case where the optical surface is a diffractive optical surface, the surface number is assigned *b symbol. The field of the radius of curvature R indicates the paraxial radius of curvature.

The refractive index of the material of the optical member with reference to g-line (wavelength $\lambda$=435.8 nm) is assumed as ng. The refractive index of the material of the optical member with reference to F-line (wavelength $\lambda$=486.1 nm) is assumed as nF. The refractive index of the material of the optical member with reference to C-line (wavelength $\lambda$=656.3 nm) is assumed as nC. At this time, the partial dispersion ratio $\theta$gF of the material of the optical member is defined by the following expression (A).

$$\theta gF=(ng-nF)/(nF-nC) \quad \text{(A)}$$

[Aspherical Surface Data] table indicates the shape of an aspherical surface indicated in [Lens Data] by the following expression (B). X(y) indicates the distance (sag amount) along the optical axis direction from the tangent plane on the vertex of an aspherical surface to the position on the aspherical surface at the height y. R indicates the radius of curvature of the reference spherical surface (paraxial radius of curvature). κ indicates the conical coefficient. Ai indicates the i-th order aspherical coefficient. "E-n" indicates "×10$^{-n}$". For example, 1.234E-05=1.234×10$^{-5}$. Note that the second order aspherical coefficient A2 is 0. The description thereof is omitted.

$$X(y)=(y^2/R)/\{1+(1-\kappa\times y^2/R^2)^{1/2}\}+A4\times y^4+A6\times y^6+A8\times y^8+A10\times y^{10} \quad \text{(B)}$$

In a case where the optical system includes a diffractive optical element, the phase shape Ψ of the diffractive optical surface indicated in [Diffractive Optical Surface Data] is represented by the following expression (C).

$$\Psi(h,m)=\{2\pi/(m\times\lambda 0)\}\times(C2\times h^2+C4\times h^4+C6\times h^6\ldots) \quad \text{(C)}$$

Where h: the height in the direction perpendicular to the optical axis, m: the diffractive order of diffracted light, λ0: design wavelength, and Ci: phase coefficient (i=2, 4, . . . ).

Note that the refractive power φD of the diffractive surface for any wavelength λ and at any diffractive order m can be represented as the following expression (D) using the lowest order phase coefficient C2.

$$\phi D(h,m)=-2\times C2\times m\times\lambda/\lambda 0 \quad \text{(D)}$$

In [Diffractive Optical Surface Data] table, for the diffractive optical surface indicated in [Lens Data], the design wavelength λ0, the diffractive order m, the second order phase coefficient C2, and the fourth order phase coefficient C4 in the expression (C) are indicated. Similar to [Aspherical Surface Data] table, "E-n" indicates "×10$^{-n}$".

In a case where the optical system is not a room optical system, f is the focal length of the entire room lens and β indicates the photographing magnification as [Variable Distance Data on Short-Distance Photographing]. [Variable Distance Data on Short-Distance Photographing] table indicates the surface distance at the surface number where the surface distance corresponds to each focal length and photographing magnification and the surface distance in [Lens Data] is "Variable".

In a case where the optical system is a room optical system, the surface distance at the surface number where the surface distance corresponds to each of rooming states including the wide-angle end (H), intermediate focal length (M) and telephoto end (T) and the surface distance is "Variable" in [Lens Data] is indicated as [Variable Distance Data on Zoom Photographing]. [Lens Group Data] table indicates the first surface (surface nearest to the object) and the focal length of each lens group.

[Conditional Expression Corresponding Value] table indicates the value corresponding to each conditional expression.

Hereinafter, in all data values, for the listed focal length f, radius of curvature R, surface distance D, other lengths and the like, "mm" is generally used if not otherwise specified. However, no limitation is imposed thereon because the optical system can achieve an equivalent optical performance even with proportional scaling (enlargement or contraction).

The entire description of tables so far commonly applies to all the examples. Redundant description is hereinafter omitted.

First Example

A first example is described with reference to FIGS. 1 and 2 and Table 1. FIG. 1 shows a lens configuration of an optical system according to the first example of this embodiment upon focusing on infinity. The optical system LS(1) according to the first example consists of, arranged sequentially from an object side: a first lens group G1 having a positive refractive power; a second lens group G2 having a negative refractive power; and a third lens group G3 having a positive refractive power. Upon focusing from an infinite distant object to a short-distance (finite distant) object, the second lens group G2 moves toward the image along the optical axis. The aperture stop S is disposed on an object-side neighborhood of the third lens group G3. Similar to the first lens group G1 and the third lens group G3, the aperture stop S is fixed with respect to the image surface I upon focusing. The symbol (+) or (−) assigned to each lens group symbol indicates the refractive power of the corresponding lens group. This also applies to all the examples.

The first lens group G1 consists of, arranged sequentially from an object side: a protective glass HG having a significantly low refractive power; a biconvex positive lens L11; a biconvex positive lens L12; a biconcave negative lens L13; and a cemented lens that consists of a negative meniscus lens L14 having a convex surface facing the object, and a positive meniscus lens L15 having a convex surface facing the object. In this example, the positive lens L11 of the first lens group G1 corresponds to the object-side lens.

The second lens group G2 consists of, arranged sequentially from the object side: a biconcave negative lens L21; and a cemented lens that consists of a positive meniscus lens L22 having a concave surface facing the object, and a biconcave negative lens L23. In this example, the positive meniscus lens L22 of the second lens group G2 corresponds to the lens (specified lens) satisfying the conditional expressions (1) to (2) and the like.

The third lens group G3 includes, arranged sequentially from an object side: a first partial group G31 having a positive refractive power; a second partial group G32 having a negative refractive power; and a third partial group G33 having a positive refractive power. The first partial group G31 consists of a cemented lens consisting of a biconvex positive lens L31 and a negative meniscus lens L32 having a concave surface facing the object, the lenses being arranged sequentially from the object side. The second partial group G32 consists of, arranged sequentially from an object side: a cemented lens consisting of a biconvex positive lens L33 and a biconcave negative lens L34; and a biconcave negative lens L35. The third partial group G33 consists of, arranged sequentially from an object side: a biconvex positive lens L36; and a cemented lens consisting of a biconvex positive lens L37 and a biconcave negative lens L38. In this example, the negative lens L38 of the third lens group G3 corresponds to the image-side lens. The positive lens L33 of the third lens group G3 corresponds to the lens satisfying the conditional expressions (1) to (2) and the like. The second partial group G33 of the third lens group G3 constitutes a vibration-proof lens group that is movable in a direction perpendicular to the optical axis, and corrects displacement in imaging position due to a camera shake or the like (an image blur on the image surface I). Note that a fixed aperture stop (flare cut diaphragm) Sa is disposed between the second partial group G32 and the third partial group G33 of the third lens group G3.

An image surface I is disposed on the image side of the third lens group G3. An insertable and replaceable optical filter FL is disposed between the third lens group G3 and the image surface I. For example, an NC filter (neutral color filter), a color filter, a polarizing filter, an ND filter (neutral density filter), an IR filter (infrared-cut filter) or the like is adopted as the insertable and replaceable optical filter FL.

The following Table 1 lists the values of data on the optical system according to the first example.

TABLE 1

[General Data]

| | |
|---|---|
| f | 392.000 |
| FNO | 2.881 |
| 2ω | 6.245 |
| Y | 21.63 |
| TL | 396.319 |
| BF | 74.502 |

[Lens Data]

| Surface Number | R | D | nd | vd | θgF |
|---|---|---|---|---|---|
| 1 | 1200.37020 | 5.000 | 1.51680 | 63.88 | 0.536 |
| 2 | 1199.78950 | 1.000 | | | |
| 3 | 250.71590 | 16.414 | 1.43385 | 95.25 | 0.540 |
| 4 | −766.97150 | 45.000 | | | |
| 5 | 158.99440 | 18.720 | 1.43385 | 95.25 | 0.540 |
| 6 | −400.00000 | 2.261 | | | |
| 7 | −377.29180 | 6.000 | 1.61266 | 44.46 | 0.564 |
| 8 | 461.79700 | 95.451 | | | |
| 9 | 70.05760 | 4.000 | 1.79500 | 45.31 | 0.560 |
| 10 | 47.57190 | 11.944 | 1.49782 | 82.57 | 0.539 |
| 11 | 1223.84820 | D11(Variable) | | | |
| 12 | −546.41280 | 2.500 | 1.80610 | 40.97 | 0.569 |
| 13 | 76.73180 | 6.996 | | | |
| 14 | −241.81680 | 4.500 | 1.65940 | 26.87 | 0.633 |
| 15 | −56.62280 | 2.500 | 1.48749 | 70.32 | 0.529 |
| 16 | 234.80990 | D16(Variable) | | | |
| 17 | ∞ | 5.100 | | (Aperture Stop S) | |
| 18 | 95.57020 | 6.000 | 1.75500 | 52.33 | 0.548 |
| 19 | −75.36620 | 1.800 | 1.80809 | 22.74 | 0.629 |
| 20 | −757.80810 | 4.500 | | | |
| 21 | 279.80870 | 4.700 | 1.74971 | 24.66 | 0.627 |
| 22 | −82.76070 | 1.800 | 1.59319 | 67.90 | 0.544 |
| 23 | 50.04470 | 3.390 | | | |
| 24 | −226.07440 | 1.800 | 1.83481 | 42.73 | 0.565 |
| 25 | 105.63280 | 4.250 | | | |
| 26 | ∞ | 0.250 | | | |
| 27 | 105.07290 | 3.700 | 1.69680 | 55.52 | 0.543 |
| 28 | −158.46840 | 0.100 | | | |
| 29 | 92.25180 | 4.000 | 1.72047 | 34.71 | 0.583 |
| 30 | −129.17240 | 1.800 | 1.92119 | 23.96 | 0.620 |
| 31 | 404.52160 | 7.500 | | | |
| 32 | ∞ | 1.500 | 1.51680 | 63.88 | 0.536 |
| 33 | ∞ | BF | | | |

[Variable distance data on short-distance photographing]

| | Upon focusing on infinity f = 392.000 | Upon focusing on a short-distance object β = −0.173 |
|---|---|---|
| D11 | 13.847 | 29.047 |
| D16 | 33.495 | 18.295 |

[Conditional Expression Corresponding Value]
<positive meniscus lens L22>

Conditional Expression(1)
ndLZ + (0.01425 × vdLZ) = 2.042
Conditional Expression(2), (2-1), (2-2), (2-3), (2-4)
vdLZ = 26.87
Conditional Expression(3), (3-1)

TABLE 1-continued

θgFLZ + (0.00316 × vdLZ) = 0.7179
Conditional Expression(4)
ndLZ + (0.00787 × vdLZ) = 1.871
Conditional Expression(5), (5-1), (5-2), (5-3), (5-4), (5-5)
ndLZ = 1.65940
Conditional Expression(6)
DLZ = 4.500
Conditional Expression(7)
ndLZ − (0.040 × vdLZ − 2.470) × vdLZ = 39.148
Conditional Expression(8)
ndLZ − (0.020 × vdLZ − 1.080) × vdLZ = 16.239
<positive lens L33>

Conditional Expression(1)
ndLZ + (0.01425 × vdLZ) = 2.101
Conditional Expression(2), (2-1), (2-2), (2-3), (2-4)
vdLZ = 24.66
Conditional Expression(3), (3-1)
θgFLZ + (0.00316 × vdLZ) = 0.7049
Conditional Expression(4)
ndLZ + (0.00787 × vdLZ) = 1.944
Conditional Expression(5), (5-1), (5-2), (5-3), (5-4), (5-5)
ndLZ = 1.74971
Conditional Expression(6)
DLZ = 4.700
Conditional Expression(7)
ndLZ − (0.040 × vdLZ − 2.470) × vdLZ = 38.335
Conditional Expression(8)
ndLZ − (0.020 × vdLZ − 1.080) × vdLZ = 16.220

Figure 2:
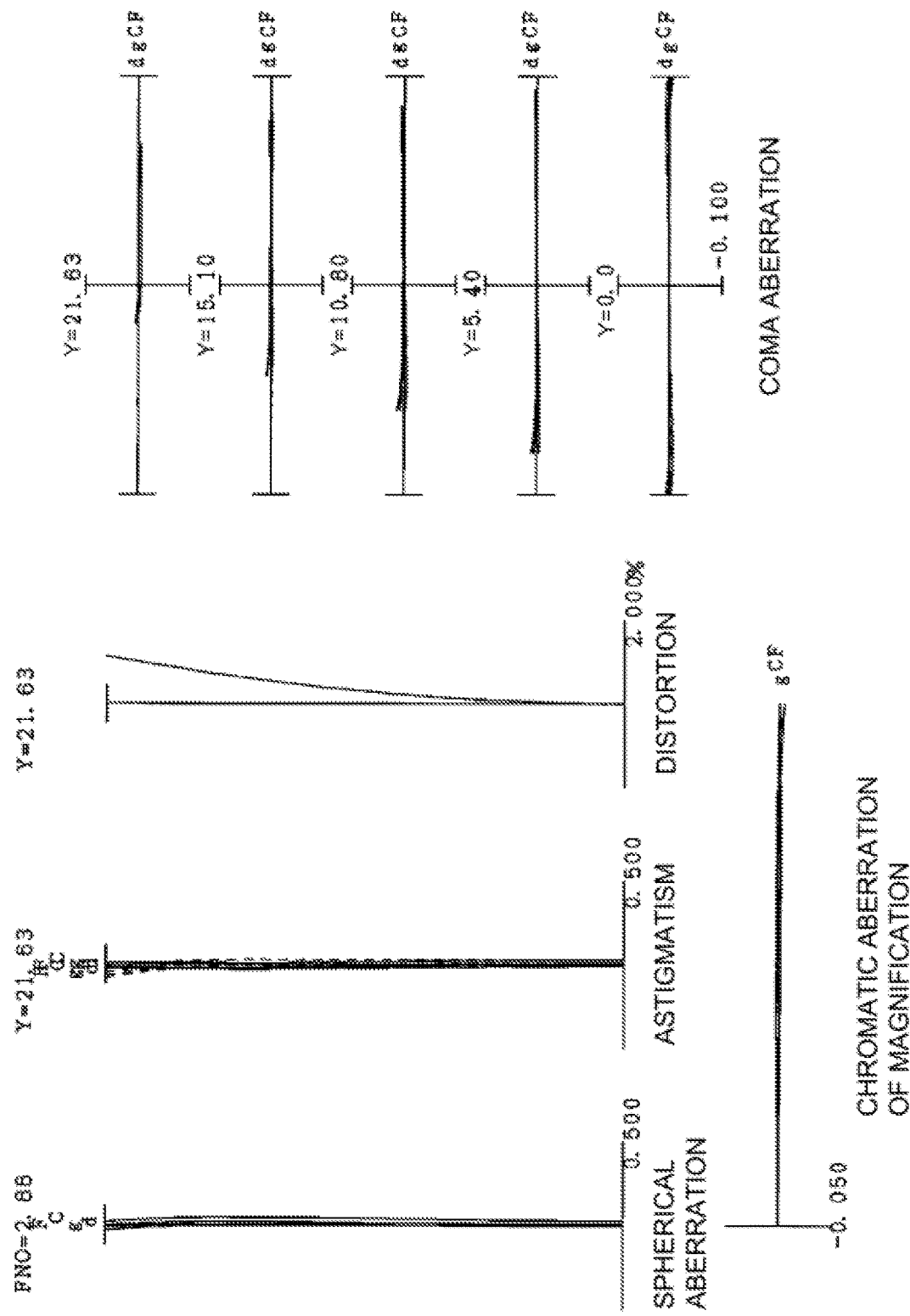
FIG. 2 shows various aberration graphs of the optical system according to the first example upon focusing on infinity.

FIG. 2 shows various aberration graphs of the optical system according to the first example upon focusing on infinity. In each aberration graph, FNO indicates the F-number, and Y indicates the image height. Note that the spherical aberration graph indicates the value of the F-number or the numerical aperture corresponding to the maximum diameter. The astigmatism graph and the distortion graph each indicate the maximum value of the image height. The coma aberration graph indicates the value of each image height, d indicates d-line (wavelength λ=587.6 nm), g indicates g-line (wavelength λ=435.8 nm), C indicates C-line (wavelength λ=656.3 nm) and F indicates F-line (wavelength λ=486.1 nm). In the astigmatism graph, the solid line indicates a sagittal image surface, and the broken line indicates a meridional image surface. Note that also in aberration graphs of the following examples, symbols similar to those in this example are used, and redundant description is omitted.

Based on each of various aberration graphs, in the optical system according to the first example, the various aberrations are favorably corrected, and excellent image forming performances are achieved.

Second Example

Figure 3:
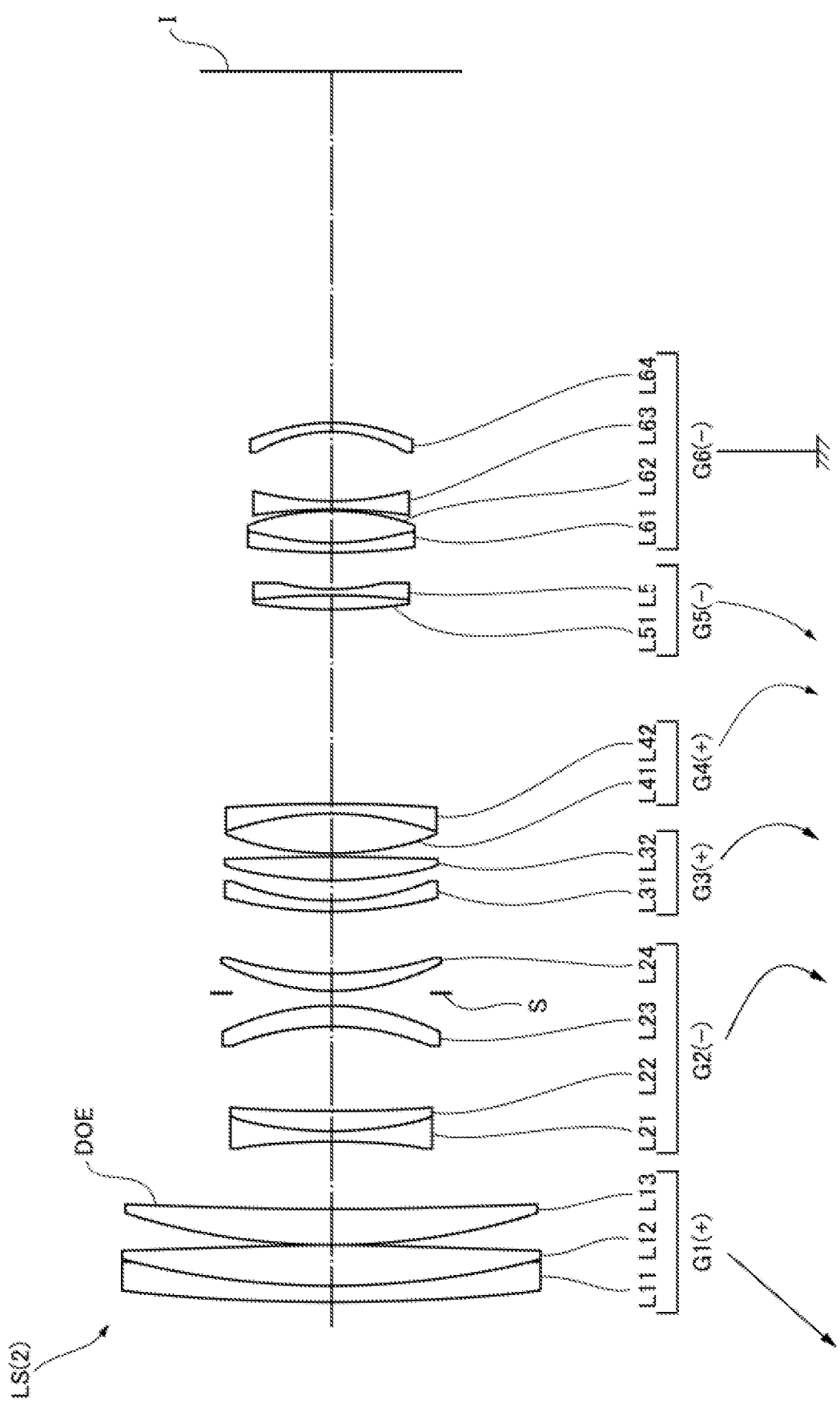
FIG. 3 shows a lens configuration of an optical system according to a second example upon focusing on infinity.

A second example is described with reference to FIGS. 3 and 4A to 4C and Table 2. FIG. 3 shows a lens configuration of an optical system according to the second example of this embodiment upon focusing on infinity. The optical system LS(2) according to the second example consists of, arranged sequentially from an object side: a first lens group G1 having a positive refractive power; a second lens group G2 having a negative refractive power; a third lens group G3 having a positive refractive power; a fourth lens group G4 having a positive refractive power; a fifth lens group G5 having a negative refractive power; and a sixth lens group G6 having a negative refractive power. During zooming from the wide angle end state (W) to the telephoto end state (T), the first to fifth lens groups G1 to G5 respectively move in directions indicated by arrows in FIG. 3. The aperture stop S is disposed in the second lens group G2.

The first lens group G1 consists of, arranged sequentially from an object side: a cemented lens consisting of a negative meniscus lens L11 having a convex surface facing the object, and a biconvex positive lens L12; and a positive meniscus lens L13 having a convex surface facing the object. In this example, the negative meniscus lens L11 of the first lens group G1 corresponds to the object-side lens. A diffractive optical element DOE is disposed on the image-side lens surface of the positive meniscus lens L13. The diffractive optical element DOE is, for example, a close-contact multi-layer type diffractive optical element where two types of diffractive optical element items different in material from each other are in contact on the same diffractive optical groove. A primary diffraction grating (a diffraction grating having a rotationally symmetric shape with respect to the optical axis) having a predetermined grating height is formed by two types of ultraviolet-curing resins.

The second lens group G2 consists of, arranged sequentially from an object side: a cemented lens consisting of a biconcave negative lens L21, and a positive meniscus lens L22 having a convex surface facing the object; a positive meniscus lens L23 having a concave surface facing the object; and a positive meniscus lens L24 having a convex surface facing the object. An aperture stop S is disposed between the positive meniscus lens L23 and the positive meniscus lens L24 of the second lens group G2. In this example, the positive meniscus lens L22 of the second lens group G2 corresponds to the lens satisfying the conditional expressions (1) to (2) and the like. The cemented lens consisting of the negative lens L21 and the positive meniscus lens L22 of the second lens group G2, and the positive meniscus lens L23 constitute a vibration-proof lens group (partial group) movable in a direction perpendicular to the optical axis, and corrects displacement in the imaging position due to a camera shake and the like (an image blur on the image surface I).

The third lens group G3 consists of, arranged sequentially from an object side: a negative meniscus lens L31 having a convex surface facing the object; and a biconvex positive lens L32.

The fourth lens group G4 consists of a cemented lens consisting of a biconvex positive lens L41 and a negative meniscus lens L42 having a concave surface facing the object, the lenses being arranged sequentially from the object side.

The fifth lens group G5 consists of a cemented lens consisting of a biconvex positive lens L51 and a biconcave negative lens L52, the lenses being arranged sequentially from an object side. In this example, focusing is achieved by moving the entire fifth lens group G5 along the optical axis.

The sixth lens group G6 consists of, arranged sequentially from the object side: a cemented lens consisting of a negative meniscus lens L61 having a convex surface facing the object, and a biconvex positive lens L62; a biconcave negative lens L63; and a negative meniscus lens L64 having a concave surface facing the object. An image surface I is disposed on the image side of the sixth lens group G6. In this example, the negative meniscus lens L64 of the sixth lens group G6 corresponds to the image-side lens. The negative meniscus lens L61 of the sixth lens group G6 corresponds to the lens satisfying the conditional expressions (1) to (2) and the like.

The following Table 2 lists the values of data on the optical system according to the second example.

TABLE 2

[General Data]
Zooming ratio 2.00

|  | W | M | T |
|---|---|---|---|
| f | 199.985 | 300.128 | 400.487 |
| FNO | 5.770 | 5.773 | 7.777 |
| 2ω | 12.088 | 8.032 | 3.016 |
| Y | 21.60 | 21.60 | 21.60 |
| TL | 218.509 | 276.018 | 309.437 |
| BF | 63.575 | 63.605 | 63.797 |

[Lens Data]

| Surface Number | R | D | nd | νd | θgF |
|---|---|---|---|---|---|
| 1 | 338.9295 | 3.0000 | 1.806100 | 33.34 | 0.5904 |
| 2 | 157.1292 | 7.1098 | 1.487490 | 70.32 |  |
| 3 | −645.1901 | 0.1000 |  |  |  |
| 4 | 127.7241 | 6.3846 | 1.516800 | 64.13 |  |
| 5*b | 1000.0000 | D5(Variable) |  |  |  |
| 6 | −122.6329 | 1.7000 | 1.743997 | 44.79 |  |
| 7 | 65.7202 | 3.5689 | 1.659398 | 26.87 | 0.6323 |
| 8 | 249.7691 | 15.0000 |  |  |  |
| 9 | −47.9778 | 3.5000 | 1.756462 | 24.89 | 0.6196 |
| 10 | −45.0509 | 2.2932 |  |  |  |
| 11 | ∞ | 0.5000 |  | (Aperture Stop S) |  |
| 12 | 43.2479 | 2.9936 | 1.620041 | 36.26 |  |
| 13 | 64.4050 | D13(Variable) |  |  |  |
| 14 | 82.9323 | 1.7000 | 1.808090 | 22.74 |  |
| 15 | 46.2622 | 3.6463 |  |  |  |
| 16 | 71.4836 | 4.1939 | 1.612720 | 58.54 |  |
| 17 | −405.4059 | D17(Variable) |  |  |  |
| 18 | 56.3851 | 6.9255 | 1.497820 | 82.57 |  |
| 19 | −60.8758 | 1.7000 | 1.755000 | 52.33 |  |
| 20 | −374.3030 | D20(Variable) |  |  |  |
| 21 | 102.7274 | 2.4918 | 1.592701 | 35.31 |  |
| 22 | −125.8788 | 1.0000 | 1.755000 | 52.33 |  |
| 23 | 40.8982 | D23(Variable) |  |  |  |
| 24 | 121.6273 | 1.7000 | 1.659398 | 26.87 | 0.6323 |
| 25 | 52.1810 | 5.7438 | 1.595510 | 39.21 |  |
| 26 | −42.4345 | 0.1000 |  |  |  |
| 27 | −97.3797 | 1.5000 | 1.456000 | 91.37 |  |
| 28 | 59.1706 | 12.2493 |  |  |  |
| 29 | −26.6286 | 1.5000 | 1.755000 | 52.33 | 0.5476 |
| 30 | −37.6940 | BF |  |  |  |

[Diffractive optical surface data]

5th Surface

λ0 = 587.6
m = 1
C2 = −2.57E−05
C4 = −2.04E−11

[Variable distance data on zoom photographing]

|  | W | M | T |
|---|---|---|---|
| D5 | 11.860 | 93.192 | 119.742 |
| D13 | 10.900 | 0.500 | 3.244 |
| D17 | 0.600 | 5.172 | 0.600 |
| D20 | 34.411 | 13.877 | 0.200 |
| D23 | 6.561 | 9.070 | 31.254 |

[Lens Group Data]

| Group | First surface | Focal length |
|---|---|---|
| G1 | 1 | 213.671 |
| G2 | 6 | −546.584 |
| G3 | 14 | 370.319 |
| G4 | 18 | 149.206 |
| G5 | 21 | −72.703 |
| G6 | 24 | −875.523 |

[Conditional Expression Corresponding Value]

TABLE 2-continued

<positive meniscus lens L22>

Conditional Expression(1)
ndLZ + (0.01425 × vdLZ) = 2.042
Conditional Expression (2), (2-1), (2-2), (2-3), (2-4)
vdLZ = 26.87
Conditional Expression(3), (3-1)
θgFLZ + (0.00316 × vdLZ) = 0.7172
Conditional Expression(4)
ndLZ + (0.00787 × vdLZ) = 1.871
Conditional Expression(5), (5-1), (5-2), (5-3), (5-4), (5-5)
ndLZ = 1.659398
Conditional Expression(6)
DLZ = 3.5689
Conditional Expression(7)
ndLZ − (0.040 × vdLZ − 2.470) × vdLZ = 39.148
Conditional Expression(8)
ndLZ − (0.020 × vdLZ − 1.080) × vdLZ = 16.239

<negative meniscus lens L61>

Conditional Expression(1)
ndLZ + (0.01425 × vdLZ) = 2.042
Conditional Expression(2), (2-1), (2-2), (2-3), (2-4)
vdLZ = 26.87
Conditional Expression(3), (3-1)
θgFLZ + (0.00316 × vdLZ) = 0.7172
Conditional Expression(4)
ndLZ + (0.00787 × vdLZ) = 1.871
Conditional Expression(5), (5-1), (5-2), (5-3), (5-4), (5-5)
ndLZ = 1.659398
Conditional Expression(6)
DLZ = 1.7000
Conditional Expression(7)
ndLZ − (0.040 × vdLZ − 2.470) × vdLZ = 39.148
Conditional Expression(8)
ndLZ − (0.020 × vdLZ − 1.080) × vdLZ = 16.239

FIGS. 4A, 4B and 4C show various aberration graphs of the optical system according to the second example upon focusing on infinity in a wide angle end state, an intermediate focal length state, and a telephoto end state, respectively. Based on each of various aberration graphs, in the optical system according to the second example, the various aberrations are favorably corrected, and excellent image forming performances are achieved.

Third Example

A third example is described with reference to FIGS. 5 and 6 and Table 3. FIG. 5 shows a lens configuration of an optical system according to the third example of this embodiment upon focusing on infinity. The optical system LS(3) according to the third example consists of, arranged sequentially from an object side: a first lens group G1 having a negative refractive power; and a second lens group G2 having a positive refractive power. Upon focusing from an infinite distant object to a short-distance (finite distant) object, the second lens group G2 moves toward the object along the optical axis. The aperture stop S is disposed in the second lens group G2.

The first lens group G1 consists of, arranged sequentially from an object side: a negative meniscus lens L11 having a convex surface facing the object; a biconvex positive lens L12; a biconcave negative lens L13; and a cemented lens consisting of a biconvex positive lens L14 and a biconcave negative lens L15. In this example, the negative meniscus lens L11 of the first lens group G1 corresponds to the object-side lens. The negative lens L15 of the first lens group G1 corresponds to the lens satisfying the conditional expressions (1) to (2) and the like. The image-side lens surface of the negative lens L13 is an aspherical surface.

The second lens group G2 consists of, arranged sequentially from an object side: a biconvex positive lens L21; a cemented lens consisting of a positive meniscus lens L22 having a convex surface facing the object, and a negative meniscus lens L23 having a convex surface facing the object; a cemented lens consisting of a biconcave negative lens L24 and a biconvex positive lens L25; a plano-convex positive lens L26 having a convex surface facing the image; and a positive meniscus lens L27 having a concave surface facing the object. An image surface I is disposed on the image side of the second lens group G2. An aperture stop S is disposed between the positive lens L21 and the positive meniscus lens L22 of the second lens group G2. In this example, the positive meniscus lens L27 of the second lens group G2 corresponds to the image-side lens. The positive meniscus lens L22 of the second lens group G2 corresponds to the lens satisfying the conditional expressions (1) to (2) and the like. The image-side lens surface of the positive lens L26 is an aspherical surface.

The following Table 3 lists the values of data on the optical system according to the third example.

TABLE 3

[General Data]

| | |
|---|---|
| f | 28.773 |
| FNO | 1.8796 |
| 2ω | 75.3311 |
| Y | 21.60 |
| TL | 131.9655 |
| BF | 36.457 |

[Lens Data]

| Surface Number | R | D | nd | vd | θgF |
|---|---|---|---|---|---|
| 1 | 57.6700 | 1.7000 | 1.713000 | 53.94 | 0.5441 |
| 2 | 23.6385 | 10.630 | | | |
| 3 | 360.0000 | 3.4200 | 1.846660 | 23.78 | |
| 4 | −149.5844 | 2.1000 | | | |
| 5 | −91.6110 | 1.7000 | 1.487490 | 70.31 | |
| 6 | 34.8169 | 0.1000 | 1.520500 | 51.02 | |
| 7*a | 31.0734 | 7.4700 | | | |
| 8 | 54.5000 | 8.5700 | 1.834000 | 37.18 | |
| 9 | −43.5000 | 1.7000 | 1.749714 | 24.66 | 0.6272 |
| 10 | 475.5646 | D10(Variable) | | | |
| 11 | 41.6500 | 6.2000 | 1.589130 | 61.24 | |
| 12 | −79.7342 | 8.8800 | | | |
| 13 | ∞ | 1.0000 | | (Aperture Stop S) | |
| 14 | 71.7000 | 1.3000 | 1.659398 | 26.87 | 0.6323 |
| 15 | 165.1470 | 1.0000 | 1.672700 | 32.19 | |
| 16 | 41.0000 | 6.0900 | | | |
| 17 | −19.3844 | 1.5200 | 1.805180 | 25.46 | |
| 18 | 400.0000 | 2.4200 | 1.772500 | 49.65 | |
| 19 | −67.0000 | 0.6000 | | | |
| 20 | ∞ | 3.0800 | 1.729160 | 54.66 | |
| 21 | −50.8920 | 0.2000 | 1.520500 | 51.02 | |
| 22*a | −37.6986 | 1.1400 | | | |
| 23 | −98.0000 | 5.2100 | 1.834810 | 42.72 | 0.5651 |
| 24 | −26.8452 | 2.3629 | | | |
| 25 | ∞ | BF | | | |

[Aspherical Surface Data]

7th Surface

κ = 0.0000
A4 = −2.99E−06, A6 = −2.39E−08, A8 = 1.13E−10, A10 = −3.69E−13

22nd Surface

κ = 0.0000
A4 = 2.03E−05, A6 = 4.37E−09, A8 = 1.85E−10, A10 = −1.33E−12

[Variable distance data on short-distance photographing]

TABLE 3-continued

|  | Upon focusing on infinity f = 28.7734 | Upon focusing on a short-distance object β = −0.2174 |
|---|---|---|
| D10 | 9.5660 | 2.3031 |

[Conditional Expression Corresponding Value]

<negative lens L15>

Conditional Expression(1)
ndLZ + (0.01425 × vdLZ) = 2.101
Conditional Expression(2), (2-1), (2-2), (2-3), (2-4)
vdLZ = 24.66
Conditional Expression(3), (3-1)
θgFLZ + (0.00316 × vdLZ) = 0.7051
Conditional Expression(4)
ndLZ + (0.00787 × vdLZ) = 1.944
Conditional Expression(5), (5-1), (5-2), (5-3), (5-4), (5-5)
ndLZ = 1.749714
Conditional Expression(6)
DLZ = 1.7000
Conditional Expression(7)
ndLZ − (0.040 × vdLZ − 2.470) × vdLZ = 38.335
Conditional Expression(8)
ndLZ − (0.020 × vdLZ − 1.080) × vdLZ = 16.220
<positive meniscus lens L22>

Conditional Expression(1)
ndLZ + (0.01425 × vdLZ) = 2.042
Conditional Expression(2), (2-1), (2-2), (2-3), (2-4)
vdLZ = 26.87
Conditional Expression(3), (3-1)
θgFLZ + (0.00316 × vdLZ) = 0.7172
Conditional Expression(4)
ndLZ + (0.00787 × vdLZ) = 1.871
Conditional Expression(5), (5-1), (5-2), (5-3), (5-4), (5-5)
ndLZ = 1.659398
Conditional Expression(6)
DLZ = 1.3000
Conditional Expression(7)
ndLZ − (0.040 × vdLZ − 2.470) × vdLZ = 39.148
Conditional Expression(8)
ndLZ − (0.020 × vdLZ − 1.080) × vdLZ = 16.239

Figure 6:
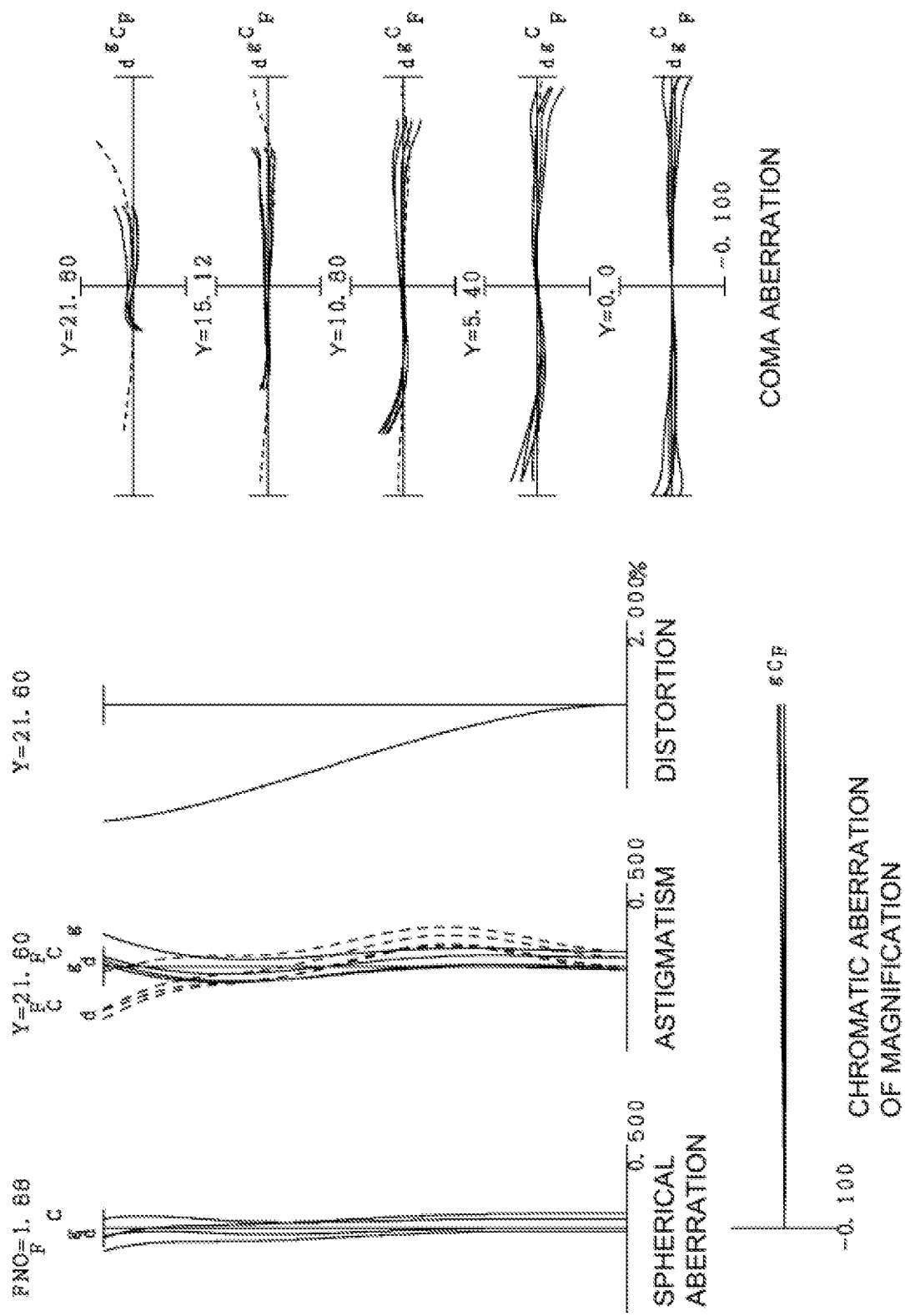
FIG. 6 shows various aberration graphs of the optical system according to the third example upon focusing on infinity.

FIG. 6 shows various aberration graphs of the optical system according to the third example upon focusing on infinity. Based on each of various aberration graphs, in the optical system according to the third example, the various aberrations are favorably corrected, and excellent image forming performances are achieved.

Fourth Example

Figure 7:
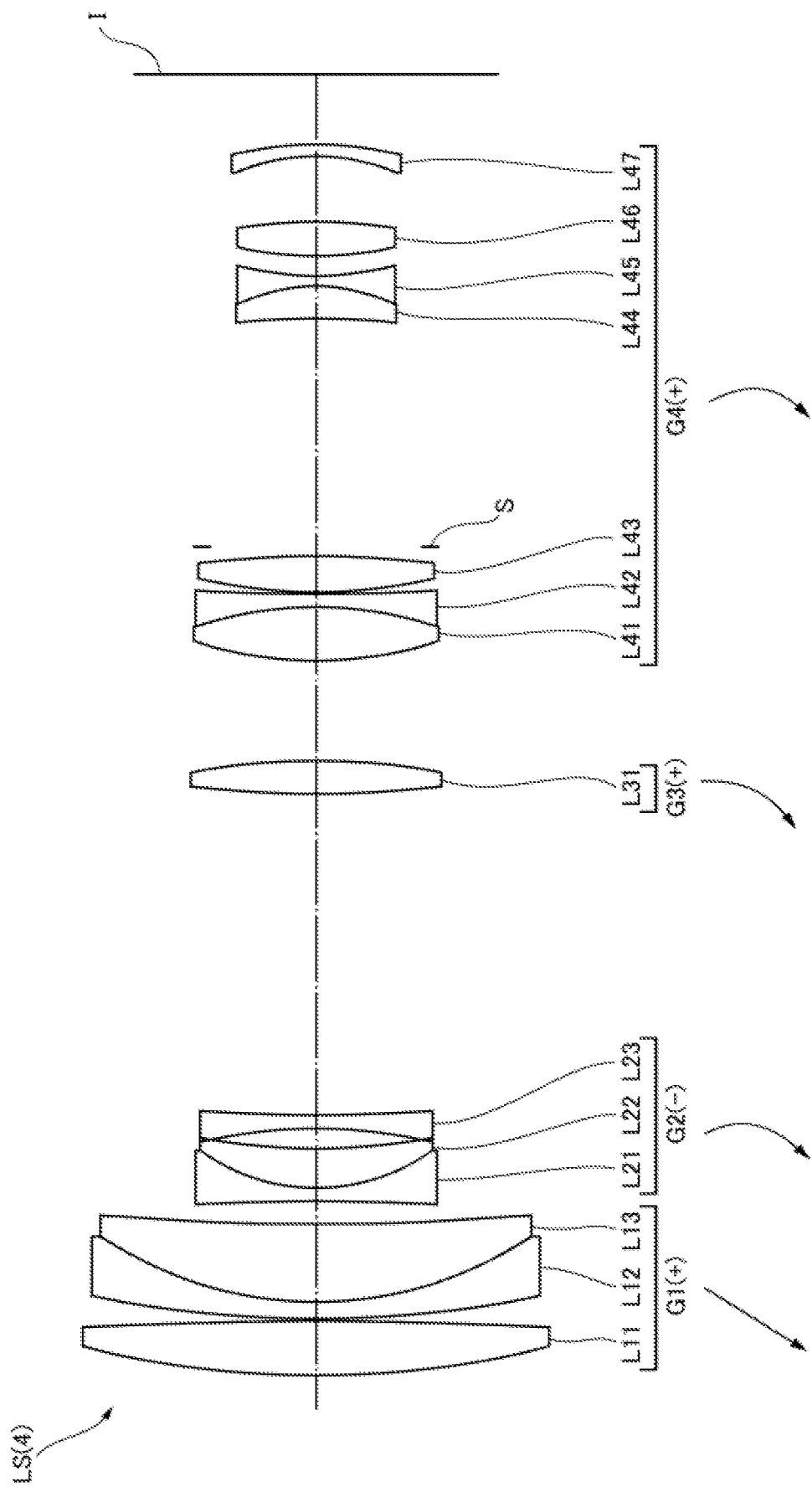
FIG. 7 shows a lens configuration of an optical system according to a fourth example upon focusing on infinity.

A fourth example is described with reference to FIGS. 7 and 8A to 8C and Table 4. FIG. 7 shows a lens configuration of an optical system according to the fourth example of this embodiment upon focusing on infinity. The optical system LS(4) according to the fourth example consists of, arranged sequentially from an object side: a first lens group G1 having a positive refractive power; a second lens group G2 having a negative refractive power; a third lens group G3 having a positive refractive power; and a fourth lens group G4 having a positive refractive power. During rooming from the wide angle end state (W) to the telephoto end state (T), the first to fourth lens groups G1 to G4 respectively move in directions indicated by arrows in FIG. 7. The aperture stop S is disposed in the fourth lens group G4.

The first lens group G1 consists of, arranged sequentially from an object side: a biconvex positive lens L11; and a cemented lens consisting of a negative meniscus lens L12 having a convex surface facing the object, and a positive meniscus lens L13 having a convex surface facing the object. In this example, the positive lens L11 of the first lens group G1 corresponds to the object-side lens. The negative meniscus lens L12 of the first lens group G1 corresponds to the lens satisfying the conditional expressions (1) to (2) and the like.

The second lens group G2 consists of, arranged sequentially from the object side: a biconcave negative lens L21; a cemented lens that consists of a biconcave negative lens L21 and a positive meniscus lens L22 having a convex surface facing the object; and a biconcave negative lens L23.

The third lens group G3 consists of a biconvex positive lens L31. In this example, upon focusing from an infinite distant object to a short-distance (finite distant) object, the entire third lens group G3 moves toward the object along the optical axis.

The fourth lens group G4 consists of, arranged sequentially from an object side: a cemented lens consisting of a biconvex positive lens L41, and a biconcave negative lens L42; a biconvex positive lens L43; a cemented lens consisting of a positive meniscus lens L44 having a concave surface facing the object, and a biconcave negative lens L45; a biconvex positive lens L46; and a negative meniscus lens L47 having a concave surface facing the object. An image surface Z is disposed on the image side of the fourth lens group G4. An aperture stop S is disposed between the positive lens L43 and the positive meniscus lens L44 of the fourth lens group G4. In this example, the negative meniscus lens L47 of the fourth lens group G4 corresponds to the image-side lens.

The following Table 4 lists the values of data on the optical system according to the fourth example.

TABLE 4

[General Data]
Zooming ratio 4.05

|  | W | M | T |
|---|---|---|---|
| f | 72.1 | 135.0 | 292.1 |
| FNO | 4.707 | 4.863 | 6.494 |
| 2ω | 23.341 | 12.218 | 5.684 |
| Y | 14.75 | 14.75 | 14.75 |
| TL | 168.674 | 197.816 | 220.732 |
| BF | 43.294 | 45.652 | 70.374 |

[Lens Data]

| Surface Number | R | D | nd | vd | θgF |
|---|---|---|---|---|---|
| 1 | 93.841 | 5.6 | 1.51680 | 63.88 | 0.536 |
| 2 | −447.915 | 0.2 |  |  |  |
| 3 | 112.303 | 1.7 | 1.61155 | 31.26 | 0.618 |
| 4 | 39.024 | 8 | 1.51742 | 52.20 | 0.558 |
| 5 | 262.500 | D5(Variable) |  |  |  |
| 6 | −239.035 | 1.3 | 1.69680 | 55.52 | 0.543 |
| 7 | 20.159 | 4 | 1.80809 | 22.74 | 0.629 |
| 8 | 61.046 | 2.038 |  |  |  |
| 9 | −54.537 | 1.4 | 1.85026 | 32.35 | 0.595 |
| 10 | 167.455 | D10(Variable) |  |  |  |
| 11 | 102.636 | 3.4 | 1.58913 | 61.22 | 0.540 |
| 12 | −68.899 | D12(Variable) |  |  |  |
| 13 | 39.218 | 5.5 | 1.49700 | 81.73 | 0.537 |
| 14 | −39.212 | 1.3 | 1.85026 | 32.35 | 0.595 |
| 15 | 207.543 | 0.2 |  |  |  |
| 16 | 51.630 | 3.7 | 1.48749 | 70.31 | 0.529 |
| 17 | −98.216 | 0.9 |  |  |  |
| 18 | ∞ | 23.297 |  | (Aperture Stop S) |  |
| 19 | −79.941 | 3.3 | 1.80100 | 34.92 | 0.585 |
| 20 | −17.991 | 1 | 1.70000 | 48.11 | 0.560 |
| 21 | 29.977 | 2 |  |  |  |
| 22 | 35.573 | 3.5 | 1.60342 | 38.03 | 0.583 |

TABLE 4-continued

| 23 | −52.781 | 6.6996 | | | |
| 24 | −20.538 | 1.2 | 1.77250 | 49.62 | 0.552 |
| 25 | −34.657 | BF | | | |

[Variable distance data on zoom photographing]

| | W | M | T |
|---|---|---|---|
| D5 | 2.306 | 36.768 | 51.599 |
| D10 | 32.727 | 21.603 | 2.157 |
| D12 | 10.112 | 13.560 | 16.367 |

[Lens Group Data]

| Group | First surface | Focal length |
|---|---|---|
| G1 | 1 | 127.677 |
| G2 | 6 | −31.532 |
| G3 | 11 | 70.494 |
| G4 | 13 | 147.512 |

[Conditional Expression Corresponding Value]

Conditional Expression(1)
ndLZ + (0.01425 × vdLZ) = 2.057
Conditional Expression(2), (2-1), (2-2), (2-3), (2-4)
vdLZ = 31.26
Conditional Expression(3), (3-1)
θgFLZ + (0.00316 × vdLZ) = 0.7168
Conditional Expression(4)
ndLZ + (0.00787 × vdLZ) = 1.858
Conditional Expression(5), (5-1), (5-2), (5-3), (5-4), (5-5)
ndLZ = 1.61155
Conditional Expression(6)
DLZ = 1.7
Conditional Expression(7)
ndLZ − (0.040 × vdLZ − 2.470) × vdLZ = 39.736
Conditional Expression(8)
ndLZ − (0.020 × vdLZ − 1.080) × vdLZ = 15.829

Figure 8A:
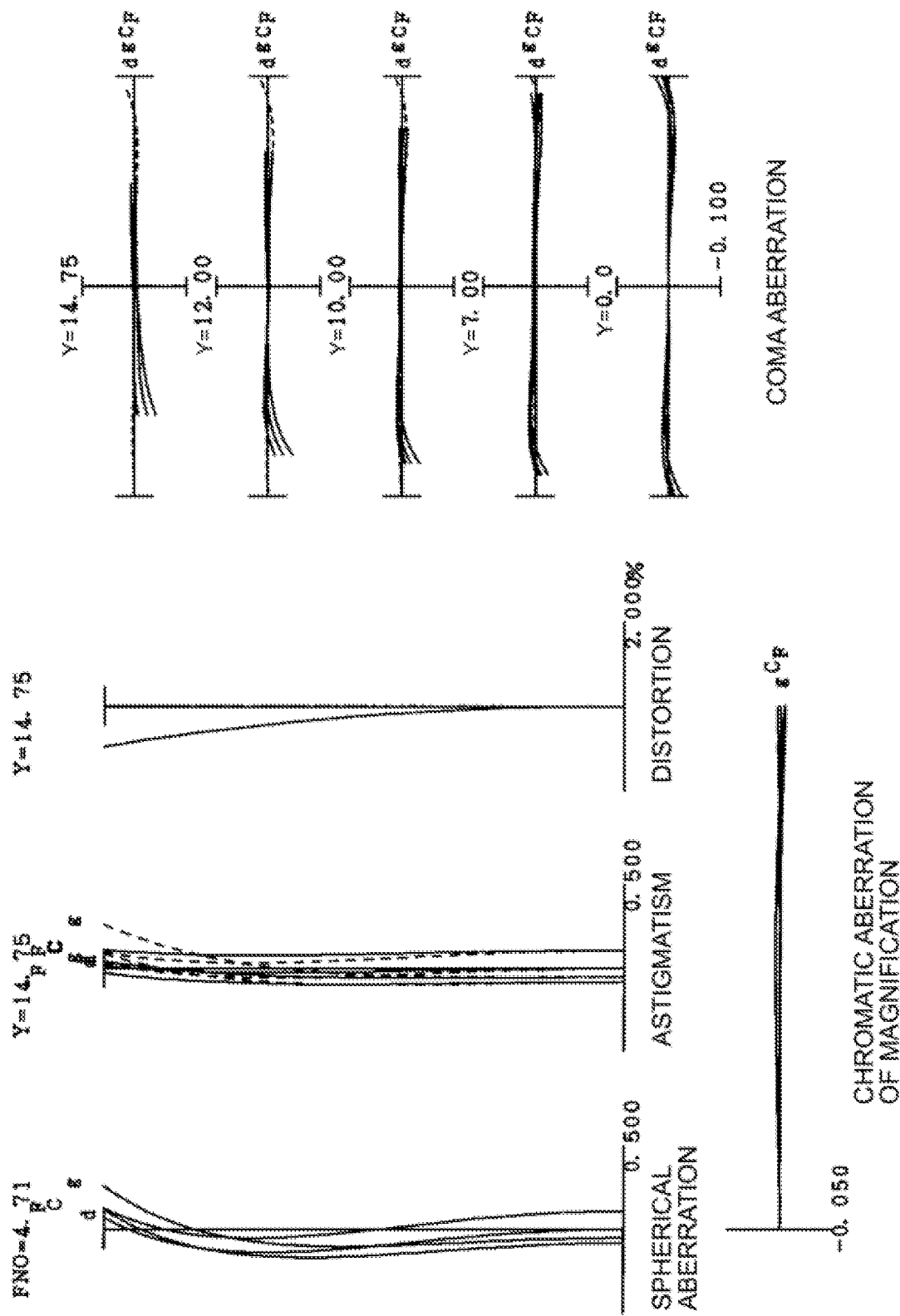
FIGS. 8A, 8B and 8C show various aberration graphs of the optical system according to the fourth example upon focusing on infinity in a wide angle end state, an intermediate focal length state, and a telephoto end state, respectively.
Figure 8B:
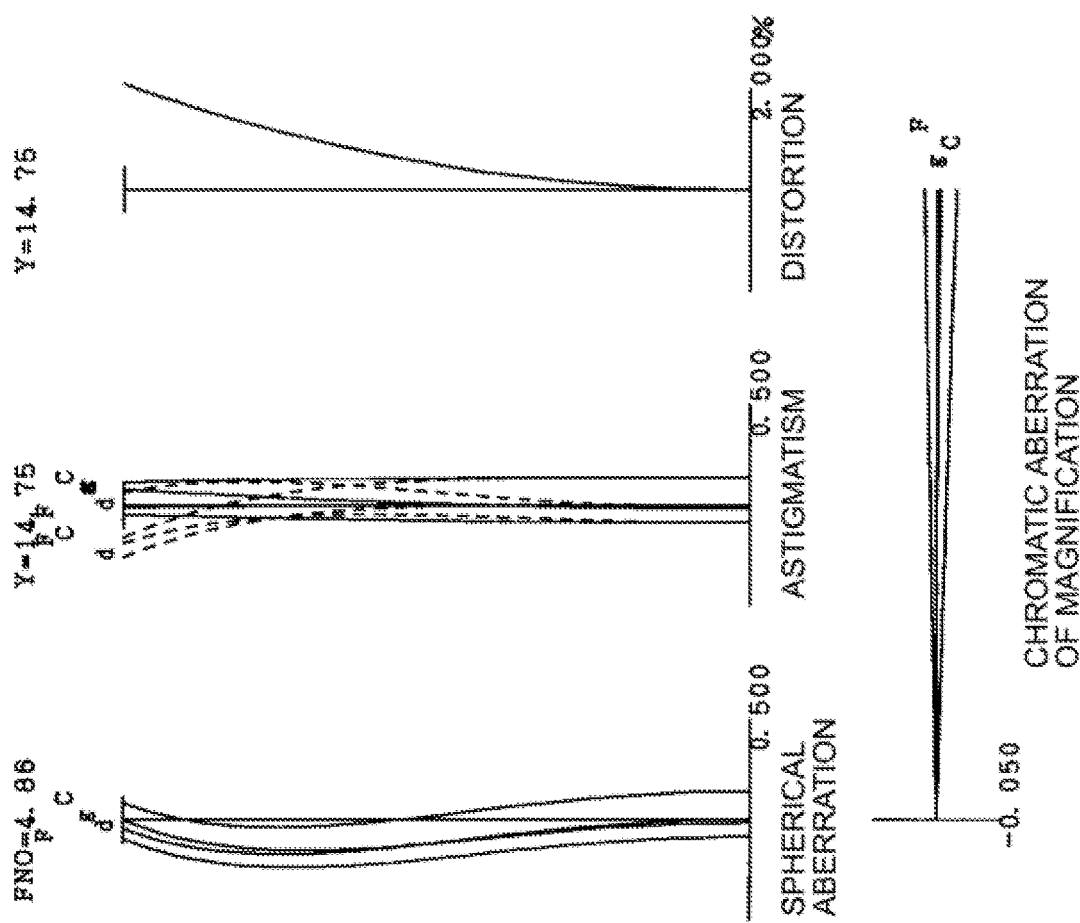
Figure 8C:
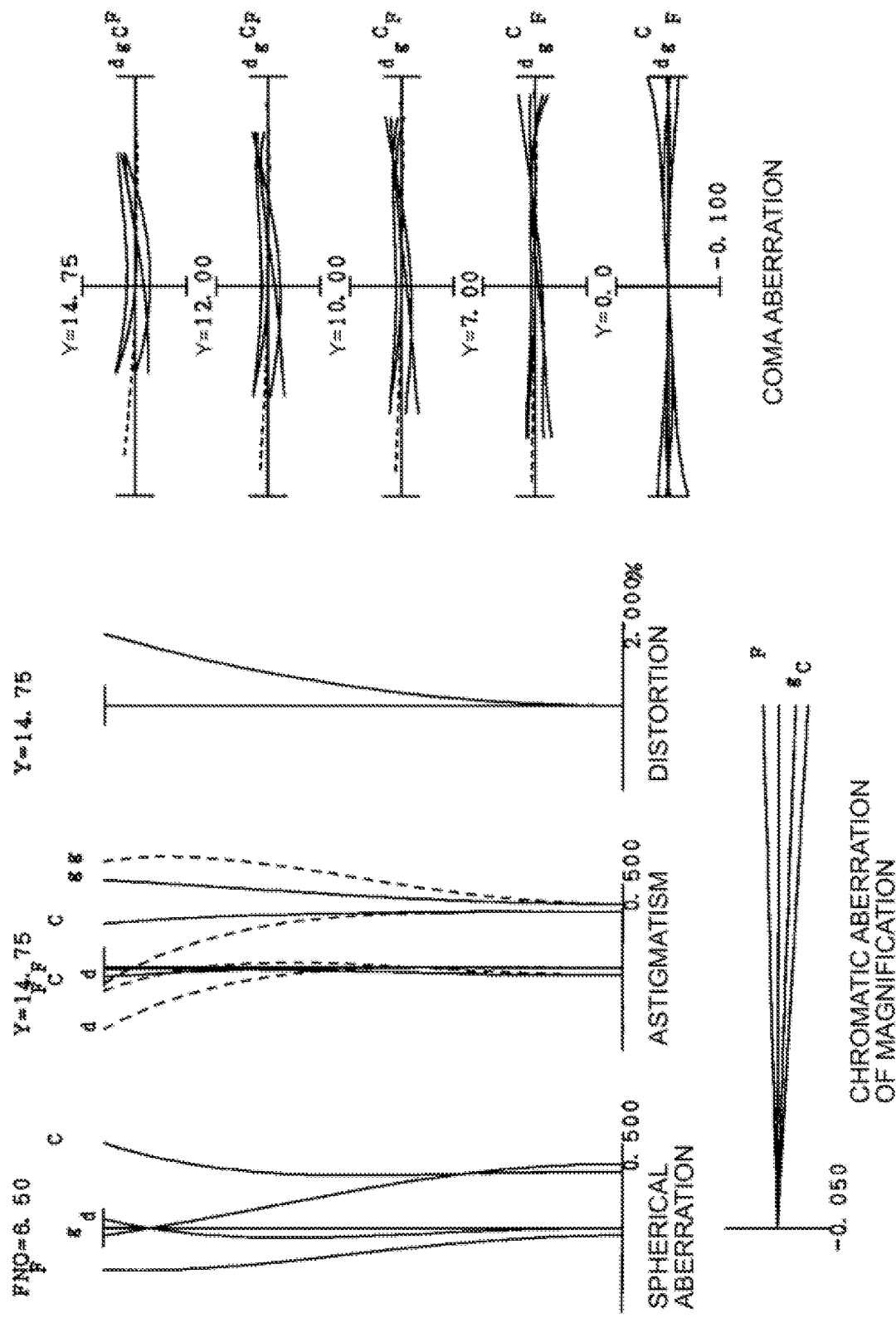

FIGS. 8A, 8B and 8C show various aberration graphs of the optical system according to the fourth example upon focusing on infinity in a wide angle end state, an intermediate focal length state, and a telephoto end state, respectively. Based on each of various aberration graphs, in the optical system according to the fourth example, the various aberrations are favorably corrected, and excellent image forming performances are achieved.

Fifth Example

Figure 9:
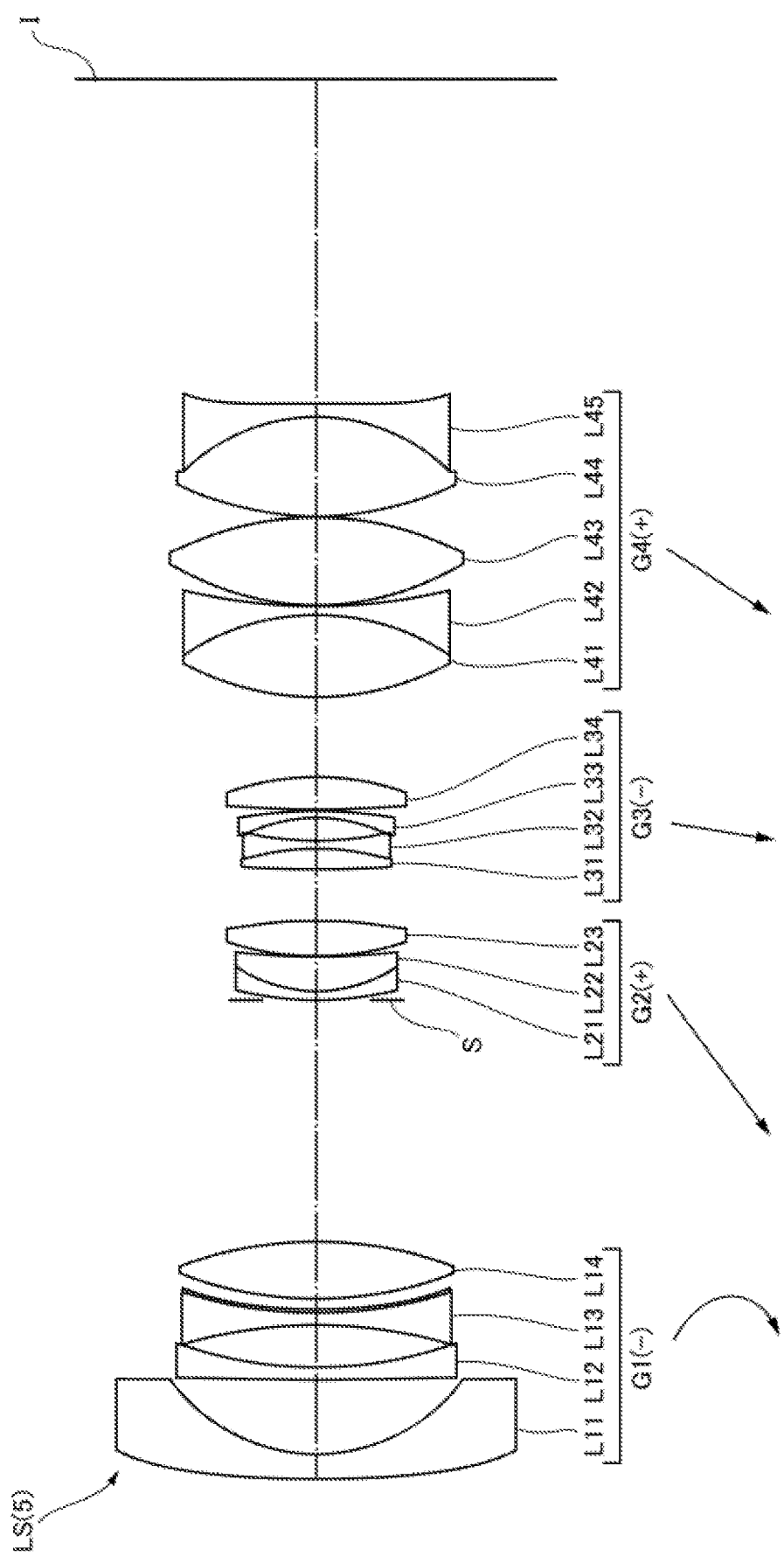
FIG. 9 shows a lens configuration of an optical system according to a fifth example upon focusing on infinity.

A fifth example is described with reference to FIGS. 9 and 10A to 10C and Table 5. FIG. 9 shows a lens configuration of an optical system according to the fifth example of this embodiment upon focusing on infinity. The optical system LS(5) according to the fifth example consists of, arranged sequentially from an object side: a first lens group G1 having a negative refractive power; a second lens group G2 having a positive refractive power; a third lens group G3 having a negative refractive power; and a fourth lens group G4 having a positive refractive power. During rooming from the wide angle end state (W) to the telephoto end state (T), the first to fourth lens groups G1 to G4 respectively move in directions indicated by arrows in FIG. 9. An aperture stop S is disposed between the first lens group G1 and the second lens group G2, and moves together with the second lens group G2 along the optical axis during zooming.

The first lens group G1 consists of, arranged sequentially from an object side: a negative meniscus lens L11 having a convex surface facing the object; a negative meniscus lens L12 having a convex surface facing the object; a biconcave negative lens L13; and a biconvex positive lens L14. In this example, the negative meniscus lens L11 of the first lens group G1 corresponds to the object-side lens. The lens surfaces on both the sides of the negative meniscus lens L11 are aspherical surfaces. The image-side lens surface of the negative lens L13 is an aspherical surface.

The second lens group G2 consists of, arranged sequentially from an object side: a cemented lens consisting of a negative meniscus lens L21 having a convex surface facing the object, and a positive meniscus lens L22 having a convex surface facing the object; and a biconvex positive lens L23. In this example, the negative meniscus lens L21 of the second lens group G2 corresponds to the lens satisfying the conditional expressions (1) to (2) and the like.

The third lens group G3 consists of, arranged sequentially from an object side: a cemented lens consisting of a biconvex positive lens L31, and a biconcave negative lens L32; a negative meniscus lens L33 having a concave surface facing the object; and a biconvex positive lens L34. In this example, upon focusing from an infinite distant object to a short-distance (finite distant) object, the negative meniscus lens L33 and the positive lens L34 of the third lens group G3 move toward the image along the optical axis.

The fourth lens group G4 consists of, arranged sequentially from an object side: a cemented lens consisting of a biconvex positive lens L41 and a biconcave negative lens L42; a biconvex positive lens L43; and a cemented lens consisting of a biconvex positive lens L44 and a biconcave negative lens L45. An image surface I is disposed on the image side of the fourth lens group G4. In this example, the negative lens L45 of the fourth lens group G4 corresponds to the image-side lens. The image-side lens surface of the negative lens L45 is an aspherical surface.

The following Table 5 lists the values of data on the optical system according to the fifth example.

TABLE 5

[General Data]
Zooming ratio 2.07

| | W | M | T |
|---|---|---|---|
| f | 16.65 | 24.00 | 34.44 |
| FNO | 4.12 | 4.12 | 4.18 |
| 2ω | 53.80 | 41.66 | 31.60 |
| Y | 21.60 | 21.60 | 21.60 |
| TL | 168.91 | 164.50 | 169.42 |
| BF | 39.00 | 48.25 | 65.00 |

[Lens Data]

| Surface Number | R | D | nd | vd | θgF |
|---|---|---|---|---|---|
| 1*a | 157.02850 | 3.000 | 1.76684 | 46.78 | 0.5576 |
| 2*a | 19.73150 | 8.955 | | | |
| 3 | 397.62390 | 1.550 | 1.88300 | 40.66 | 0.5668 |
| 4 | 51.01700 | 5.065 | | | |
| 5 | −57.91430 | 1.500 | 1.88300 | 40.66 | 0.5668 |
| 6 | 51.94950 | 0.400 | 1.55389 | 38.09 | 0.5928 |
| 7*a | 70.15770 | 1.237 | | | |
| 8 | 44.62150 | 6.911 | 1.69895 | 30.13 | 0.6021 |
| 9 | −47.20650 | D9(Variable) | | | |
| 10 | ∞ | 0.000 | (Aperture Stop S) | | |
| 11 | 42.61580 | 1.050 | 1.74971 | 24.66 | 0.6272 |
| 12 | 17.74250 | 4.132 | 1.59154 | 39.29 | 0.5779 |
| 13 | 75.16900 | 0.100 | | | |
| 14 | 34.28950 | 4.194 | 1.53404 | 48.26 | 0.5617 |
| 15 | −63.55520 | D15(Variable) | | | |
| 16 | 151.28780 | 2.518 | 1.62004 | 36.40 | 0.5833 |
| 17 | −33.01780 | 1.000 | 1.88300 | 40.66 | 0.5668 |
| 18 | 44.83300 | 2.756 | | | |

TABLE 5-continued

| 19 | −20.44030 | 0.800 | 1.88300 | 40.66 | 0.5668 |
|---|---|---|---|---|---|
| 20 | −59.69050 | 0.150 | | | |
| 21 | 151.29690 | 3.966 | 1.84666 | 23.80 | 0.6215 |
| 22 | −32.91290 | D22(Variable) | | | |
| 23 | 34.01270 | 10.039 | 1.49782 | 82.57 | 0.5386 |
| 24 | −29.32300 | 1.100 | 1.83400 | 37.18 | 0.5778 |
| 25 | 71.52300 | 0.100 | | | |
| 26 | 34.90120 | 10.548 | 1.49782 | 82.57 | 0.5386 |
| 27 | −38.97720 | 0.100 | | | |
| 28 | 40.26640 | 11.985 | 1.50377 | 63.91 | 0.536 |
| 29 | −23.35670 | 1.600 | 1.80610 | 40.97 | 0.5688 |
| 30*a | −1764.39570 | BF | | | |

[Aspherical Surface Data]

1st Surface $\kappa = 1.0000$
$A4 = 3.00E-06, A6 = 3.39E-09, A8 = 0.00E+00, A10 = 0.00E+00$ 2nd Surface $\kappa = 1.0000$
$A4 = -2.11E-05, A6 = 0.00E+00, A8 = 0.00E+00, A10 = 0.00E+00$ 7th Surface $\kappa = 1.0000$
$A4 = 1.75E-05, A6 = -2.74E-08, A8 = 1.77E-11, A10 = 0.00E+00$ 30th Surface $\kappa = 1.0000$
$A4 = 1.53E-05, A6 = 8.95E-09, A8 = 0.00E+00, A10 = 0.00E+00$

[Variable distance data on zoom photographing]

| | W | M | T |
|---|---|---|---|
| D9 | 29.355 | 13.227 | 2.000 |
| D15 | 6.263 | 12.605 | 16.459 |
| D22 | 9.534 | 5.666 | 1.200 |

[Lens Group Data]

| Group | First surface | Focal length |
|---|---|---|
| G1 | 1 | −23.700 |
| G2 | 10 | 41.700 |
| G3 | 16 | −62.000 |
| G4 | 23 | 49.100 |

[Conditional Expression Corresponding Value]

Figure 10A:
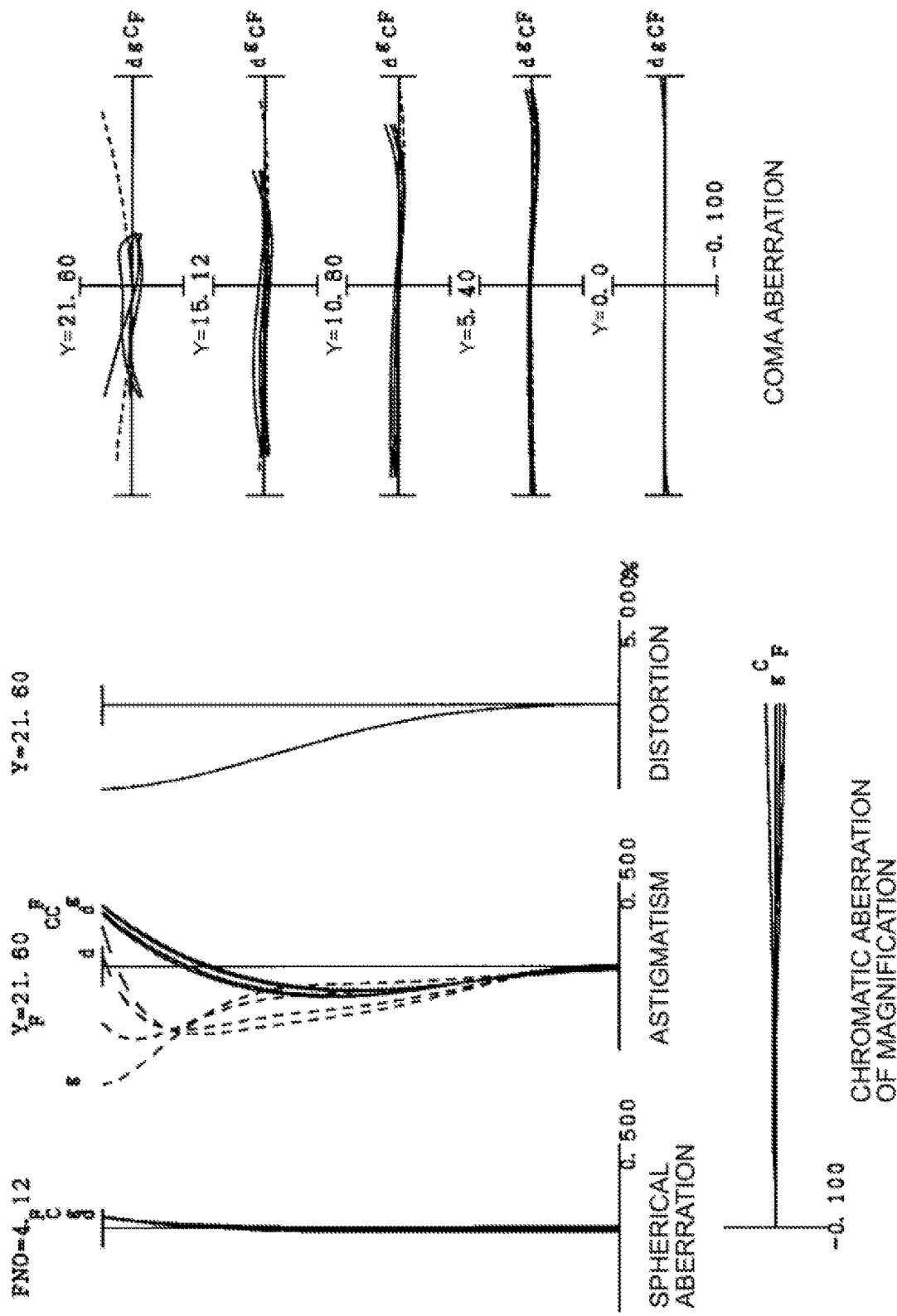
FIGS. 10A, 10B and 10C show various aberration graphs of the optical system according to the fifth example upon focusing on infinity in a wide angle end state, an intermediate focal length state, and a telephoto end state, respectively.
Figure 10B:
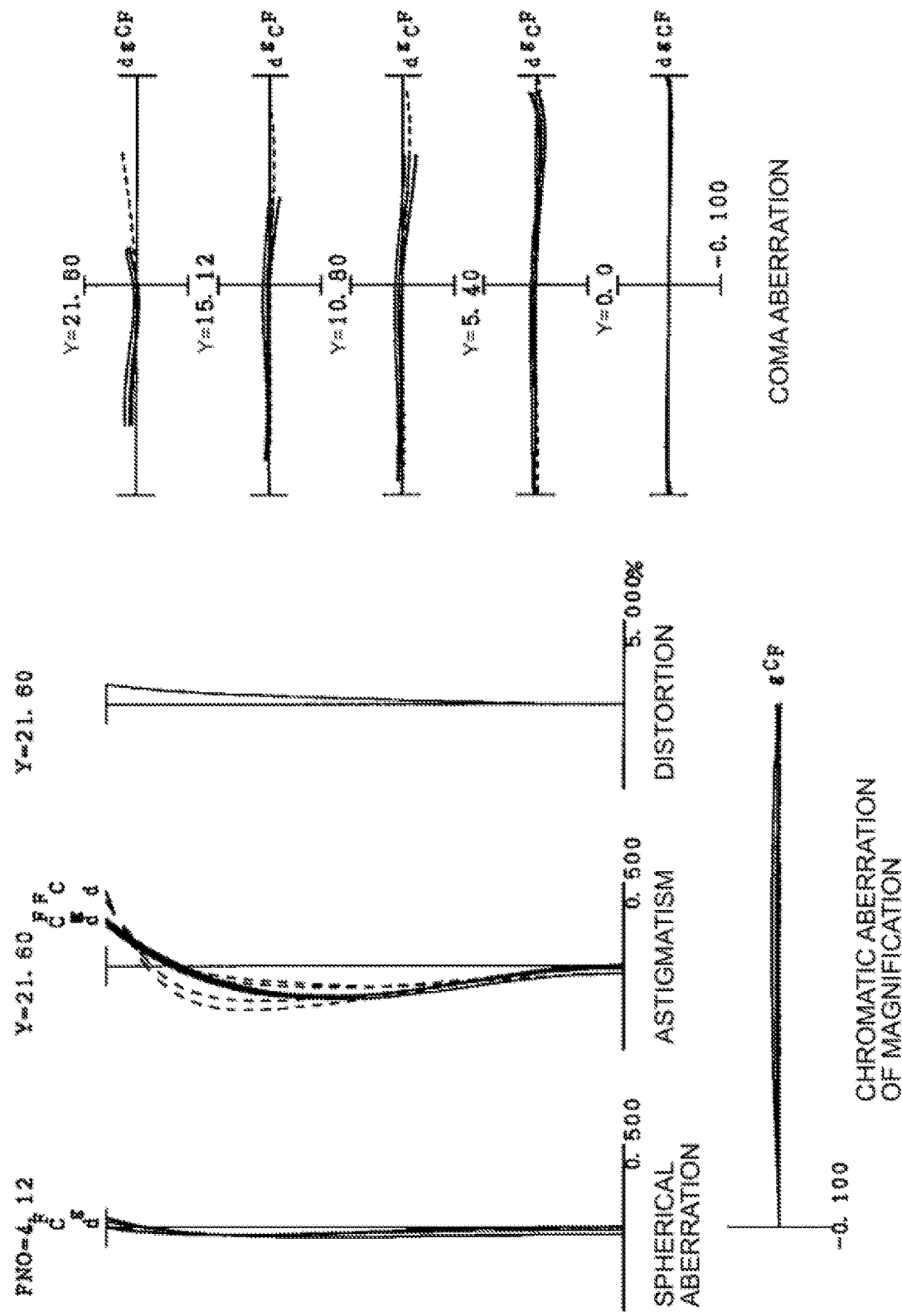
Figure 10C:
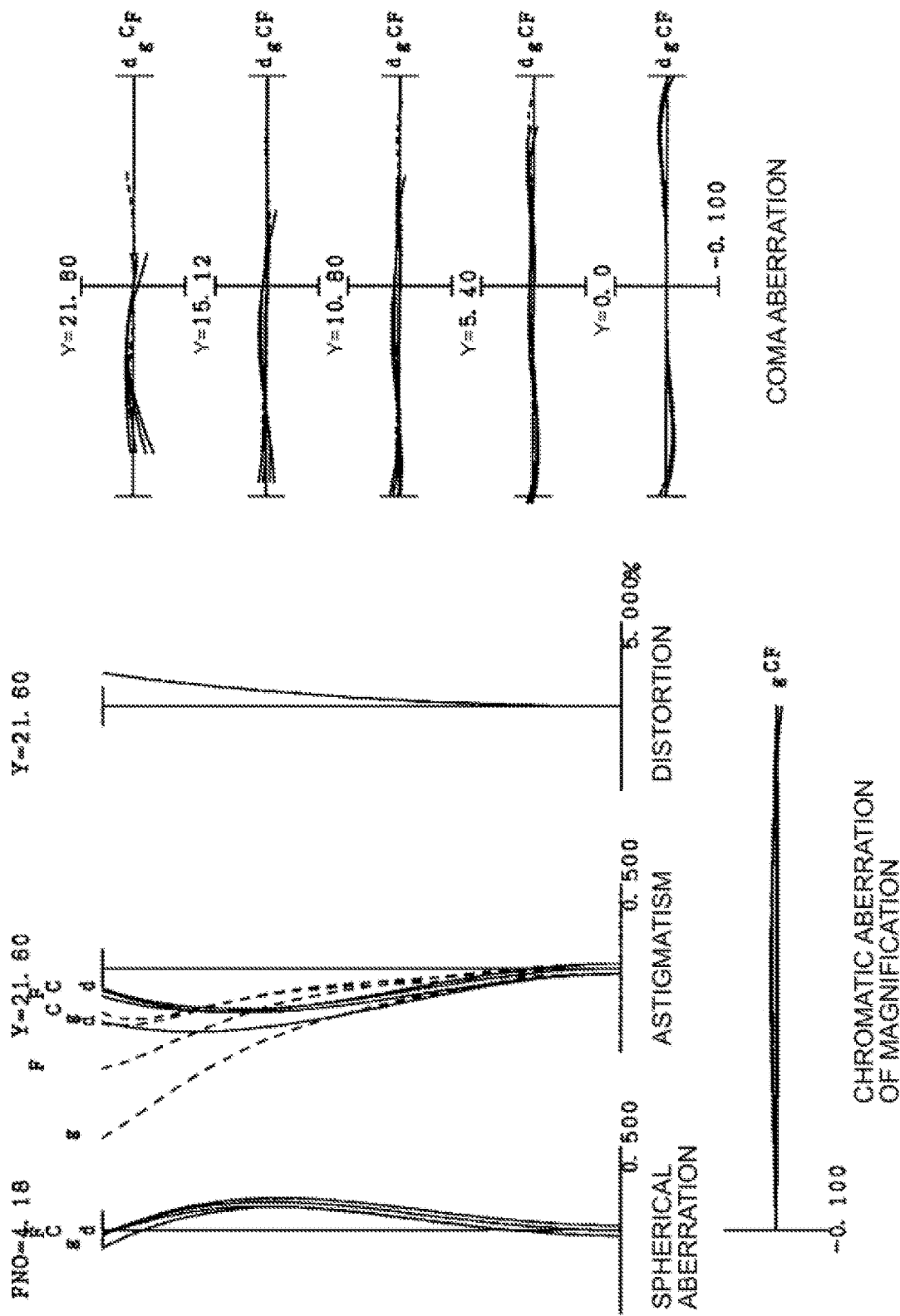

Conditional Expression(1)
$ndLZ + (0.01425 \times vdLZ) = 2.101$
Conditional Expression(2), (2-1), (2-2), (2-3), (2-4)
$vdLZ = 24.66$
Conditional Expression(3), (3-1)
$\theta gFLZ + (0.00316 \times vdLZ) = 0.7051$
Conditional Expression(4)
$ndLZ + (0.00787 \times vdLZ) = 1.944$
Conditional Expression(5), (5-1), (5-2), (5-3), (5-4), (5-5)
$ndLZ = 1.74971$
Conditional Expression(6)
$DLZ = 1.050$
Conditional Expression(7)
$ndLZ - (0.040 \times vdLZ - 2.470) \times vdLZ = 38.335$
Conditional Expression(8)
$ndLZ - (0.020 \times vdLZ - 1.080) \times vdLZ = 16.220$ FIGS. 10A, 10B and 10C show various aberration graphs of the optical system according to the fifth example upon focusing on infinity in a wide angle end state, an intermediate focal length state, and a telephoto end state, respectively. Based on each of various aberration graphs, in the optical system according to the fifth example, the various aberrations are favorably corrected, and excellent image forming performances are achieved.

Sixth Example

Figure 11:
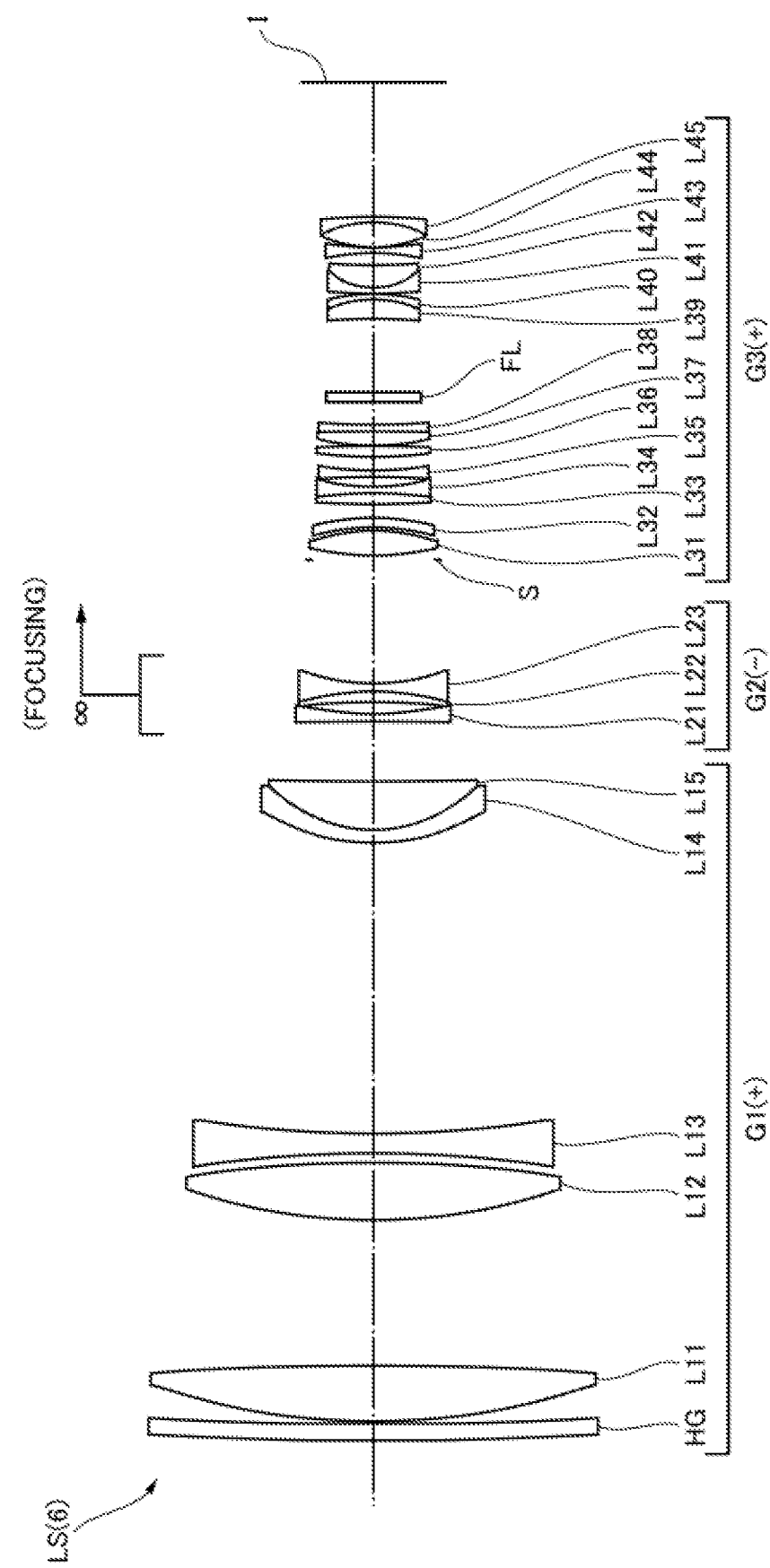
FIG. 11 shows a lens configuration of an optical system according to a sixth example upon focusing on infinity.

A sixth example is described with reference to FIGS. 11 and 12 and Table 6. FIG. 11 shows a lens configuration of an optical system according to the sixth example of this embodiment upon focusing on infinity. The optical system LS(6) according to the sixth example consists of, arranged sequentially from an object side: a first lens group G1 having a positive refractive power; a second lens group G2 having a negative refractive power; and a third lens group G3 having a positive refractive power. Upon focusing from an infinite distant object to a short-distance (finite distant) object, the second lens group G2 moves toward the image along the optical axis. The aperture stop S is disposed on an object-side neighborhood of the third lens group G3. Similar to the first lens group G1 and the third lens group G3, the aperture stop S is fixed with respect to the image surface I upon focusing.

The first lens group G1 consists of, arranged sequentially from an object side: a protective glass HG having a significantly low refractive power; a biconvex positive lens L11; a biconvex positive lens L12; a biconcave negative lens L13; and a cemented lens that consists of a negative meniscus lens L14 having a convex surface facing the object, and a positive meniscus lens L15 having a convex surface facing the object. In this example, the positive lens L11 of the first lens group G1 corresponds to the object-side lens.

The second lens group G2 consists of, arranged sequentially from the object side: a biconcave negative lens L21; and a cemented lens that consists of a positive meniscus lens L22 having a concave surface facing the object, and a biconcave negative lens L23.

The third lens group G3 consists of, arranged sequentially from an object side: a biconvex positive lens L31; a negative meniscus lens L32 having a concave surface facing the object; a cemented lens consisting of a biconvex positive lens L33 and a biconcave negative lens L34; a biconcave negative lens L35; a biconvex positive lens L36; a cemented lens consisting of a biconvex positive lens L37 and a biconcave negative lens L38; a cemented lens consisting of a positive meniscus lens L39 having a concave surface facing the object, and a negative meniscus lens L40 having a concave surface facing the object; a cemented lens consisting of a negative meniscus lens L41 having a convex surface facing the object, and a positive meniscus lens L42 having a convex surface facing the object; a biconcave negative lens L43; and a cemented lens consisting of a biconvex positive lens L44, and a negative meniscus lens L45 having a concave surface facing the object. In this example, the negative meniscus lens L45 of the third lens group G3 corresponds to the image-side lens. The positive meniscus lens L39 of the third lens group G3 corresponds to the lens satisfying the conditional expressions (1) to (2) and the like.

An image surface I is disposed on the image side of the third lens group G3. An insertable and replaceable optical filter FL is disposed between the negative lens L38 and the positive meniscus lens L39 of the third lens group G3. For example, an NC filter (neutral color filter), a color filter, a polarizing filter, an ND filter (neutral density filter), an IR filter (infrared-cut filter) or the like is adopted as the insertable and replaceable optical filter FL.

The following Table 6 lists the values of data on the optical system according to the sixth example.

TABLE 6

[General Data]

| | |
|---|---|
| f | 548.897246 |
| FNO | 4.028 |
| 2ω | 4.529 |
| Y | 21.60 |
| TL | 421.51451 |
| BF | 41.79450 |

[Lens Data]

| Surface Number | R | D | nd | vd | θgF |
|---|---|---|---|---|---|
| 1 | 1200.3704 | 5.0000 | 1.516800 | 63.88 | 0.536 |
| 2 | 1199.7897 | | | | |
| 3 | 207.5249 | 17.5000 | 1.433843 | 95.26 | 0.540 |
| 4 | −1086.1158 | 44.9000 | | | |
| 5 | 176.7586 | 18.0000 | 1.433843 | 95.26 | 0.540 |
| 6 | −399.9688 | 3.0700 | | | |
| 7 | −360.7137 | 6.0000 | 1.612660 | 44.46 | 0.564 |
| 8 | 360.6858 | 90.0000 | | | |
| 9 | 66.6831 | 4.0000 | 1.794997 | 45.32 | 0.560 |
| 10 | 46.0960 | 15.0000 | 1.497820 | 82.54 | 0.539 |
| 11 | 1030.2823 | D11(Variable) | | | |
| 12 | −1579.9519 | 2.5000 | 1.772499 | 49.68 | 0.552 |
| 13 | 115.8247 | 3.3500 | | | |
| 14 | −274.6805 | 3.5000 | 1.846679 | 23.83 | 0.620 |
| 15 | −87.1354 | 2.4000 | 1.518229 | 58.84 | 0.546 |
| 16 | 65.0724 | D16(Variable) | | | |
| 17 | ∞ | 1.5000 | | (Aperture Stop S) | |
| 18 | 89.0765 | 7.6000 | 1.487490 | 70.43 | 0.530 |
| 19 | −64.1681 | 1.2000 | | | |
| 20 | −66.2092 | 1.9000 | 1.846679 | 23.83 | 0.620 |
| 21 | −113.6112 | 5.0000 | | | |
| 22 | 309.3141 | 3.5000 | 1.846679 | 23.83 | 0.620 |
| 23 | −136.2550 | 1.9000 | 1.593190 | 67.94 | 0.544 |
| 24 | 53.6104 | 3.1000 | | | |
| 25 | −343.3953 | 1.9000 | 1.754999 | 52.33 | 0.548 |
| 26 | 94.6723 | 4.1900 | | | |
| 27 | 117.8519 | 3.5000 | 1.772499 | 49.68 | 0.552 |
| 28 | −385.7489 | 0.1000 | | | |
| 29 | 67.6179 | 4.5000 | 1.639999 | 60.14 | 0.537 |
| 30 | −410.4180 | 1.9000 | 1.846679 | 23.83 | 0.620 |
| 31 | 247.6487 | 6.5000 | | | |
| 32 | ∞ | 1.5000 | 1.516800 | 63.88 | 0.536 |
| 33 | ∞ | 25.3277 | | | |
| 34 | −212.6904 | 6.2000 | 1.659398 | 26.84 | 0.632 |
| 35 | −34.5457 | 1.6000 | 1.850000 | 27.03 | 0.609 |
| 36 | −57.9415 | 0.1000 | | | |
| 37 | 171.5239 | 1.7000 | 1.729160 | 54.61 | 0.544 |
| 38 | 20.3538 | 7.1000 | 1.581440 | 40.98 | 0.576 |
| 39 | 199.2504 | 3.7000 | | | |
| 40 | −61.4914 | 1.7000 | 1.772500 | 49.62 | 0.552 |
| 41 | 80.1566 | 0.1000 | | | |
| 42 | 39.9229 | 7.8000 | 1.581440 | 40.98 | 0.576 |
| 43 | −38.2861 | 1.7000 | 1.808090 | 22.74 | 0.629 |
| 44 | −171.6744 | BF | | | |

[Variable distance data on short-distance photographing]

| | Upon focusing on infinity f = 548.89725 | Upon focusing on a short-distance object β = −0.24282 |
|---|---|---|
| D11 | 18.50291 | 33.77284 |
| D16 | 38.17937 | 22.90945 |

[Conditional Expression Corresponding Value]

Conditional Expression(1)
ndLZ + (0.01425 × vdLZ) = 2.042
Conditional Expression(2), (2-1), (2-2), (2-3), (2-4)
vdLZ = 26.84
Conditional Expression(3), (3-1)
θgFLZ + (0.00316 × vdLZ) = 0.7168
Conditional Expression(4)
ndLZ + (0.00787 × vdLZ) = 1.871
Conditional Expression(5),(5-1),(5-2),(5-3),(5-4),(5-5)
ndLZ = 1.659398

TABLE 6-continued

Conditional Expression(6)
DLZ = 6.2000
Conditional Expression(7)
ndLZ − (0.040 × vdLZ − 2.470) × vdLZ = 39.139
Conditional Expression(8)
ndLZ − (0.020 × vdLZ − 1.080) × vdLZ = 16.239

Figure 12:
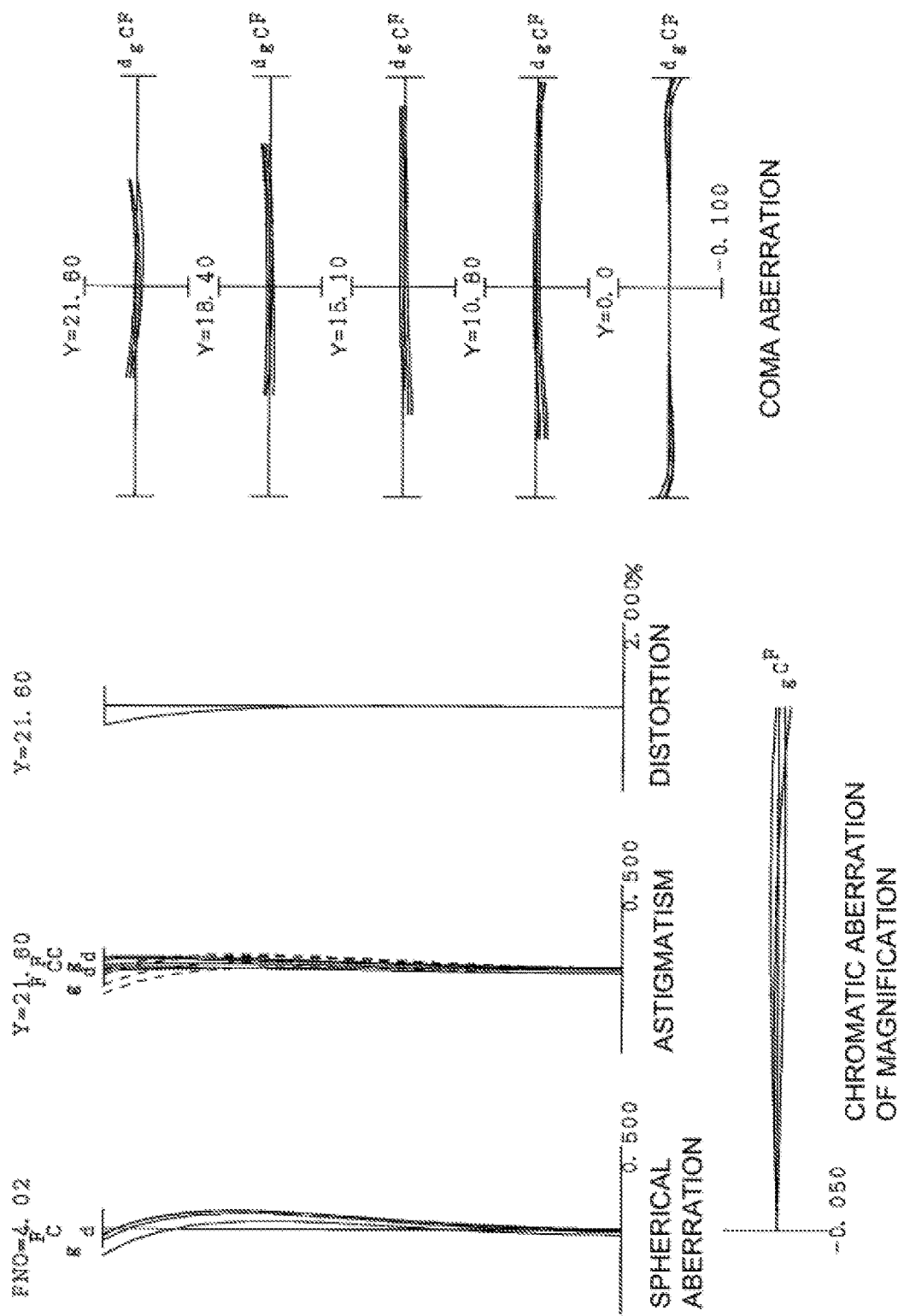
FIG. 12 shows various aberration graphs of the optical system according to the sixth example upon focusing on infinity.

FIG. 12 shows various aberration graphs of the optical system according to the sixth example upon focusing on infinity. Based on each of various aberration graphs, in the optical system according to the sixth example, the various aberrations are favorably corrected, and excellent image forming performances are achieved.

Seventh Example

Figure 13:
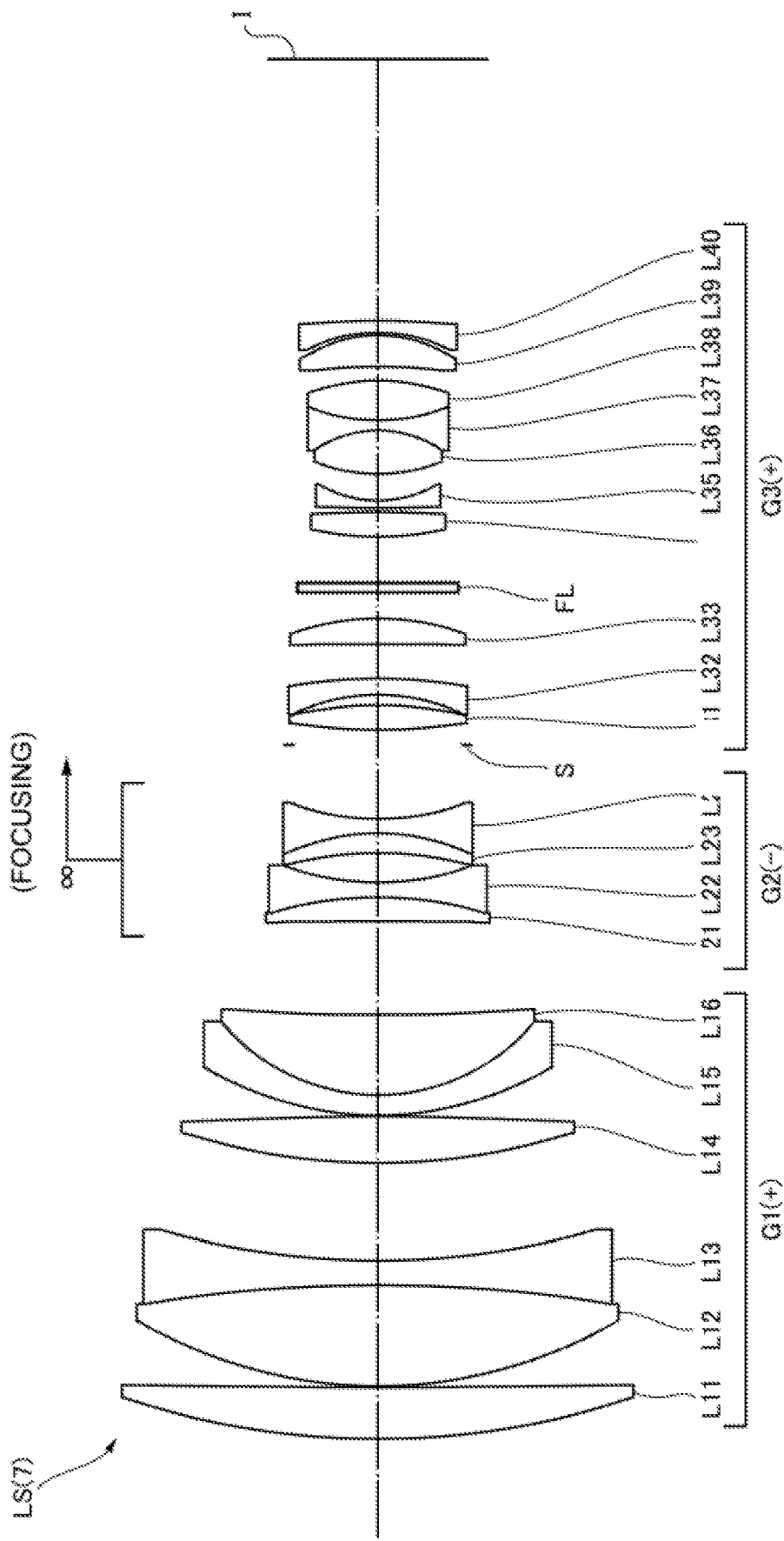
FIG. 13 shows a lens configuration of an optical system according to a seventh example upon focusing on infinity.

A seventh example is described with reference to FIGS. 13 and 14 and Table 7. FIG. 13 shows a lens configuration of an optical system according to the seventh example of this embodiment upon focusing on infinity. The optical system LS(7) according to the seventh example consists of, arranged sequentially from an object side: a first lens group G1 having a positive refractive power; a second lens group G2 having a negative refractive power; and a third lens group G3 having a positive refractive power. Upon focusing from an infinite distant object to a short-distance (finite distant) object, the second lens group G2 moves toward the image along the optical axis. The aperture stop S is disposed on an object-side neighborhood of the third lens group G3. Similar to the first lens group G1 and the third lens group G3, the aperture stop S is fixed with respect to the image surface I upon focusing.

The first lens group G1 consists of, arranged sequentially from an object side: a positive meniscus lens L11 having a convex surface facing the object; a cemented lens consisting of a biconvex positive lens L12 and a biconcave negative lens L13; a biconvex positive lens L14; and a cemented lens consisting of a negative meniscus lens L15 having a convex surface facing the object, and a positive meniscus lens L16 having a convex surface facing the object. In this example, the positive meniscus lens L11 of the first lens group G1 corresponds to the object-side lens.

The second lens group G2 consists of, arranged sequentially from an object side: a cemented lens consisting of a positive meniscus lens L21 having a concave surface facing the object, and a biconcave negative lens L22; and a cemented lens consisting of a positive meniscus lens L23 having a concave surface facing the object and a biconcave negative lens L24.

The third lens group G3 consists of, arranged sequentially from an object side: a biconvex positive lens L31; a negative meniscus lens L32 having a concave surface facing the object; a positive meniscus lens L33 having a concave surface facing the object; a biconvex positive lens L34; a negative meniscus lens L35 having a convex surface facing the object; a cemented lens consisting of a biconvex positive lens L36, a biconcave negative lens L37, and a biconvex positive lens L38; a positive meniscus lens L39 having a concave surface facing the object; and a negative meniscus lens L40 having a concave surface facing the object. In this example, the negative meniscus lens L40 of the third lens group G3 corresponds to the image-side lens. The positive lens L34 of the third lens group G3 corresponds to the lens satisfying the conditional expressions (1) to (2) and the like. The object-side lens surface of the positive meniscus lens L39 is an a spherical surface.

An image surface I is disposed on the image side of the third lens group G3. An insertable and replaceable optical filter FL is disposed between the positive meniscus lens L33 and the positive lens L34 of the third lens group G3. For example, an NC filter (neutral color filter), a color filter, a polarizing filter, an ND filter (neutral density filter), an IR filter (infrared-cut filter) or the like is adopted as the insertable and replaceable optical filter FL.

The following Table 7 lists the values of data on the optical system according to the seventh example.

TABLE 7

[General Data]

| | |
|---|---|
| f | 388.032537 |
| FNO | 4.038 |
| 2ω | 6.416 |
| Y | 21.60 |
| TL | 283.53069 |
| BF | 53.66784 |

[Lens Data]

| Surface Number | R | D | nd | vd | θgF |
|---|---|---|---|---|---|
| 1 | 167.3500 | 10.6000 | 1.497820 | 82.52 | 0.539 |
| 2 | 2361.5509 | 0.3000 | | | |
| 3 | 98.4074 | 20.8000 | 1.497820 | 82.52 | 0.539 |
| 4 | −306.6320 | 5.0000 | 1.772499 | 49.61 | 0.552 |
| 5 | 165.4047 | 20.0000 | | | |
| 6 | 135.6601 | 9.6000 | 1.446791 | 91.03 | 0.534 |
| 7 | −731.2064 | 0.3000 | | | |
| 8 | 71.2883 | 4.0000 | 1.754999 | 52.31 | 0.547 |
| 9 | 42.3960 | 16.5000 | 1.497820 | 82.52 | 0.539 |
| 10 | 435.6465 | D10(Variable) | | | |
| 11 | −1745.8851 | 5.0000 | 1.850260 | 32.35 | 0.594 |
| 12 | −78.6510 | 3.0000 | 1.639999 | 60.09 | 0.538 |
| 13 | 55.9799 | 6.0000 | | | |
| 14 | −79.8113 | 4.2000 | 1.766840 | 46.80 | 0.558 |
| 15 | −45.8300 | 2.8000 | 1.516800 | 64.10 | 0.536 |
| 16 | 51.2954 | D16(Variable) | | | |
| 17 | ∞ | 3.2000 | (Aperture Stop S) | | |
| 18 | 126.0707 | 5.0000 | 1.729157 | 54.66 | 0.544 |
| 19 | −81.3057 | 2.1000 | | | |
| 20 | −43.1962 | 3.4000 | 1.795040 | 28.54 | 0.607 |
| 21 | −104.9670 | 7.0000 | | | |
| 22 | −827.9284 | 5.3000 | 1.603001 | 65.47 | 0.541 |
| 23 | −52.9313 | 5.3151 | | | |
| 24 | ∞ | 2.0000 | 1.516800 | 64.12 | 0.536 |
| 25 | ∞ | 9.4440 | | | |
| 26 | 64.5713 | 5.0000 | 1.611553 | 31.26 | 0.618 |
| 27 | −280.9473 | 0.8000 | | | |
| 28 | 350.7347 | 1.5000 | 1.804000 | 46.58 | 0.557 |
| 29 | 24.0250 | 5.4000 | | | |
| 30 | 33.9853 | 9.0000 | 1.620040 | 36.30 | 0.587 |
| 31 | −23.4510 | 2.0000 | 1.882997 | 40.76 | 0.567 |
| 32 | 36.4535 | 8.2000 | 1.575010 | 41.49 | 0.576 |
| 33 | −45.3865 | 2.9000 | | | |
| 34*a | −91.9573 | 6.4000 | 1.589130 | 61.18 | 0.539 |
| 35 | −28.9225 | 0.5000 | | | |
| 36 | −33.4300 | 2.5000 | 1.882997 | 40.76 | 0.567 |
| 37 | −192.4648 | BF | | | |

[Aspherical Surface Data]

34th Surface

κ = 1.0000
A4 = 8.36373E−06, A6 = 2.40160E−09, A8 = 0.00000E+00, A10 = 0.00000E+00

[Variable distance data on short-distance photographing]

| | Upon focusing on infinity | Upon focusing on a short-distance object |
|---|---|---|
| | f = 388.03254 | β = −0.25415 |

TABLE 7-continued

| | | |
|---|---|---|
| D10 | 19.01315 | 27.19783 |
| D16 | 15.10916 | 6.92448 |

[Conditional Expression Corresponding Value]

Conditional Expression(1)
ndLZ + (0.01425 × vdLZ) = 2.057
Conditional Expression(2), (2-1), (2-2), (2-3), (2-4)
vdLZ = 31.26
Conditional Expression(3), (3-1)
θgFLZ + (0.00316 × vdLZ) = 0.7168
Conditional Expression(4)
ndLZ + (0.00787 × vdLZ) = 1.858
Conditional Expression(5), (5-1), (5-2), (5-3), (5-4), (5-5)
ndLZ = 1.611553
Conditional Expression(6)
DLZ = 5.0000
Conditional Expression(7)
ndLZ − (0.040 × vdLZ − 2.470) × vdLZ = 39.736
Conditional Expression(8)
ndLZ − (0.020 × vdLZ − 1.080) × vdLZ = 15.829

Figure 14:
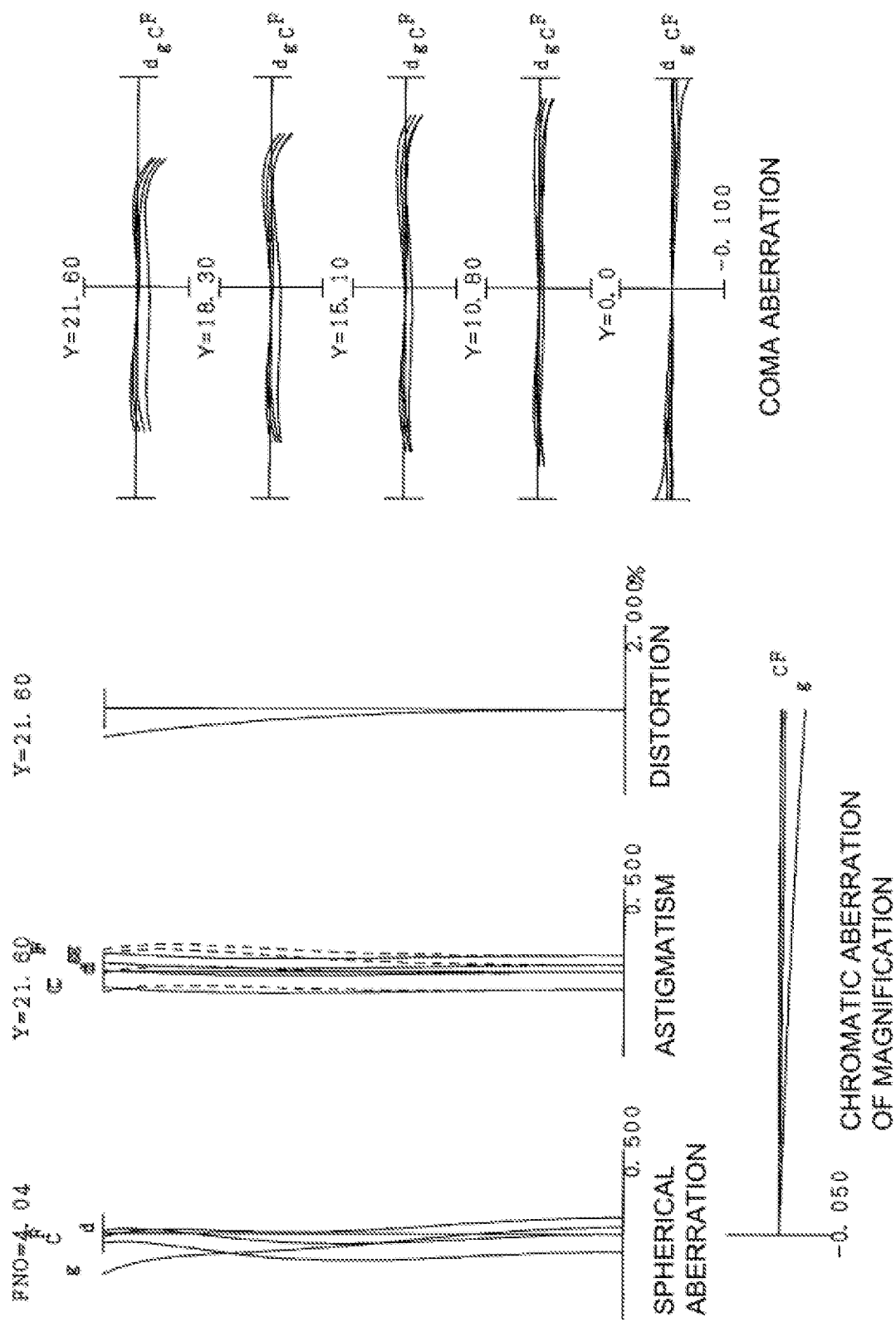
FIG. 14 shows various aberration graphs of the optical system according to the seventh example upon focusing on infinity.

FIG. 14 shows various aberration graphs of the optical system according to the seventh example upon focusing on infinity. Based on each of various aberration graphs, in the optical system according to the seventh example, the various aberrations are favorably corrected, and excellent image forming performances are achieved.

According to each example described above, as for correction of the chromatic aberrations, an optical system can be achieved where in addition to the primary achromatization, the secondary spectrum is favorably corrected.

Here, each example described above indicates a specific example of the invention of the present application. The invention of the present application is not limited thereto.

Note that the following details can be appropriately adopted in a range without degrading the optical performance of the optical system of this embodiment.

It is assumed that the focusing lens group indicates a portion that includes at least a single lens and is separated by air distances changing during focusing. That is, the group may be a focusing lens group that performs focusing from an infinite distant object to a short-distance object by moving a single or multiple lens groups, or a partial lens group in the optical axis direction. The focusing lens group may be applicable also to autofocusing, and is suitable also to motor driving for auto focusing (using an ultrasonic motor or the like).

The first and second examples of the optical system of this embodiment indicate what has the configuration having a vibration-proof function. The present application is not limited thereto, and may have a configuration having no vibration-proof function. The other examples having no vibration-proof function may have configurations having the vibration-proof function.

The lens surface may be formed by a spherical surface or a flat surface, or by an aspherical surface. In a case where the lens surface is a spherical surface or a flat surface, lens processing and assembly adjustment are facilitated, and degradation in the optical performance due to an error of processing and assembling adjustment can be prevented. Accordingly, the case is preferable. Furthermore, it is preferable because degradation in drawing performance is small even if the image surface deviates.

In a case where the lens surface is an aspherical surface, the aspherical surface may be any of an aspherical surface made by a grinding process, a glass mold aspherical surface made by forming glass into an aspherical surface shape, and a composite type aspherical surface where resin is formed on a glass surface into an aspherical surface shape. The lens surface may be a diffractive surface. The lens may be a gradient index lens (GRIN lens) or a plastic lens.

To reduce flares and ghosts and achieve an optical performance with high contrast, an antireflection coating film having a high transmissivity over a wide wavelength region may be applied to each lens surface. Accordingly, the flares and ghosts can be reduced, and a high optical performance with a high contrast can be achieved.

EXPLANATION OF NUMERALS AND CHARACTERS

| G1 | First lens group | G2 | Second lens group |
|---|---|---|---|
| G3 | Third lens group | G4 | Fourth lens group |
| G5 | Fifth lens group | G6 | Sixth lens group |
| I | Image surface | S | Aperture stop |

The invention claimed is:

1. An optical system comprising a glass lens satisfying the following conditional expressions:

$$ndLZ+(0.01425 \times vdLZ)<2.12$$

$$vdLZ<35.0$$

$$1.83<ndLZ+(0.00787 \times vdLZ)$$

$$0.702<\theta gFLZ+(0.00316 \times vdLZ)<0.800$$

where
ndLZ: a refractive index of the lens with reference to d-line,
vdLZ: Abbe number of the lens with reference to d-line, and
θgFLZ: a partial dispersion ratio of the lens, which is defined by the following expression:

$$\theta gFLZ=(ngLZ-nFLZ)/(nFLZ-nCLZ)$$

wherein a refractive index of the lens with reference to g-line is ngLZ, a refractive index of the lens with reference to F-line is nFLZ, and a refractive index of the lens with reference to C-line is nCLZ.

2. The optical system according to claim 1, wherein the glass lens satisfies the following conditional expression:

$$18.0<vdLZ<35.0.$$

3. The optical system according to any claim 1, wherein the glass lens satisfies the following conditional expression:

$$1.55<ndLZ.$$

4. The optical system according to claim 1, wherein the glass lens satisfies the following conditional expression:

$$DLZ>0.80$$

where
DLZ: a thickness [mm] of the lens on an optical axis.

5. The optical system according to claim 1, wherein the glass lens satisfies the following conditional expressions:

$$ndLZ<1.63$$

$$ndLZ-(0.040 \times vdLZ-2.470) \times vdLZ<39.809.$$

6. The optical system according to claim 1, wherein the glass lens satisfies the following conditional expression:

$$ndLZ-(0.020 \times vdLZ-1.080) \times vdLZ<16.260.$$

7. The optical system according to claim 1, wherein the glass lens satisfies the following conditional expression:

$$18.0<vdLZ<27.0.$$

8. The optical system according to claim 1, wherein the glass lens satisfies the following conditional expression:

$$1.70<ndLZ<1.85.$$

9. The optical system according to claim 1, wherein the glass lens satisfies the following conditional expression:

$$1.55<ndLZ<1.70.$$

10. The optical system according to claim 1, wherein the glass lens satisfies the following conditional expression:

$$27.0<vdLZ<35.0.$$

11. The optical system according to claim 10, wherein the glass lens satisfies the following conditional expression:

$$1.55<ndLZ<1.70.$$

12. The optical system according to claim 1, wherein the glass lens satisfies the following conditional expression:

$$25.0<vdLZ<31.0.$$

13. The optical system according to claim 12, wherein the glass lens satisfies the following conditional expression:

$$1.55<ndLZ<1.80.$$

14. The optical system according to claim 1, comprising an object-side lens disposed nearest to an object,
wherein the glass lens is disposed nearer to an image than the object-side lens.

15. The optical system according to claim 1, comprising an image-side lens disposed nearest to an image,
wherein the glass lens is disposed nearer to an object than the image-side lens.

16. An optical apparatus configured to comprise the optical system according to claim 1.

17. The optical system according to claim 1, wherein the glass lens is one of a cemented lens having two lenses cemented together.

18. The optical system according to claim 1, wherein at least one of lens surfaces of the glass lens faces air.

19. The optical system according to claim 1, including two glass lenses, each satisfying said conditional expressions and each being one of a respective cemented lens having two lenses cemented together.

20. A method of manufacturing an optical system, comprising:
disposing lenses within a lens barrel so as to include a lens satisfying the following conditional expressions:

$$ndLZ+(0.01425 \times vdLZ)<2.12$$

$$vdLZ<35.0$$

$$1.83<ndLZ+(0.00787 \times vdLZ)$$

$$0.702<\theta gFLZ+(0.00316 \times vdLZ)<0.800$$

where
ndLZ: a refractive index of the lens with reference to d-line,
vdLZ: Abbe number of the lens with reference to d-line, and
θgFLZ: a partial dispersion ratio of the lens, which is defined by the following expression:

$$\theta gFLZ=(ngLZ-nFLZ)/(nFLZ-nCLZ)$$

wherein a refractive index of the lens with reference to g-line is ngLZ, a refractive index of the lens with reference to F-line is nFLZ, and a refractive index of the lens with reference to C-line is nCLZ.

* * * * *